(12) United States Patent
Ophardt et al.

(10) Patent No.: US 10,144,027 B2
(45) Date of Patent: Dec. 4, 2018

(54) SYSTEM FOR MONITORING FLUID IN A FLUID DISPENSER

(71) Applicants: Heiner Ophardt, Arisdorf (CH); Rainer Duske, Voerde (DE); Sascha Korthauer, Kevelaer (DE); Michael Stephan, Aachen (DE)

(72) Inventors: Heiner Ophardt, Arisdorf (CH); Rainer Duske, Voerde (DE); Sascha Korthauer, Kevelaer (DE); Michael Stephan, Aachen (DE)

(*) Notice: Subject to any disclaimer, the term of this patent is extended or adjusted under 35 U.S.C. 154(b) by 0 days.

(21) Appl. No.: 15/790,331

(22) Filed: Oct. 23, 2017

(65) Prior Publication Data

US 2018/0111145 A1    Apr. 26, 2018

Related U.S. Application Data

(60) Provisional application No. 62/411,939, filed on Oct. 24, 2016.

(51) Int. Cl.
| | |
|---|---|
| B05B 12/00 | (2018.01) |
| A47K 5/12 | (2006.01) |
| G01F 23/292 | (2006.01) |
| B05B 11/00 | (2006.01) |

(52) U.S. Cl.
CPC .......... *B05B 12/004* (2013.01); *A47K 5/1211* (2013.01); *B05B 11/0054* (2013.01); *B05B 11/3002* (2013.01); *B05B 11/3009* (2013.01); *G01F 23/292* (2013.01)

(58) Field of Classification Search
CPC .............. B05B 12/004; B05B 11/0054; B05B 11/3002; B05B 11/3009; A47K 5/1211; G01F 23/292
USPC ........ 222/23, 180, 230, 64–69, 181.1–181.3, 222/185.1; 73/290 R; 250/577
See application file for complete search history.

(56) References Cited

U.S. PATENT DOCUMENTS

| | | | | |
|---|---|---|---|---|
| 5,565,977 | A * | 10/1996 | Rosinko | G01N 15/05 250/573 |
| 6,098,029 | A * | 8/2000 | Takagi | G06T 7/60 382/100 |
| 6,274,880 | B1 * | 8/2001 | Walker | B41J 2/17566 250/577 |
| 7,107,838 | B2 * | 9/2006 | Chai | C02F 1/003 73/290 R |
| 7,872,746 | B2 * | 1/2011 | Gao | A61M 1/0023 356/246 |
| 9,027,788 | B2 * | 5/2015 | Ophardt | A47K 5/1205 222/180 |
| 9,138,091 | B2 * | 9/2015 | Zhao | A47G 23/16 |
| 2007/0158363 | A1 | 7/2007 | Ophardt | |
| 2008/0121663 | A1 | 5/2008 | Ophardt et al. | |
| 2010/0147879 | A1 | 6/2010 | Ophardt et al. | |

(Continued)

*Primary Examiner* — Lien Ngo
(74) *Attorney, Agent, or Firm* — Thope North & Western, LLP

(57) ABSTRACT

A hand cleaning liquid dispenser including a fluid level gauging mechanism with a plurality, preferably three or more, vertically spaced optical sensors located closely adjacent an external of a side wall of the reservoir to each receive electromagnetic radiation transmitted through the side wall from within the reservoir with the electromagnetic radiation sensed originating from an emitter directing the electromagnetic radiation preferably through the reservoir downwardly.

20 Claims, 10 Drawing Sheets

(56) References Cited

U.S. PATENT DOCUMENTS

2010/0288788 A1 11/2010 Ophardt
2011/0017769 A1 1/2011 Ophardt

* cited by examiner

SYSTEM FOR MONITORING FLUID IN A FLUID DISPENSER

SCOPE OF THE INVENTION

This invention relates to systems for monitoring fluid in a reservoir and, more particularly, to fluid level gauges external to a fluid containing reservoir in a fluid dispenser.

BACKGROUND OF THE INVENTION

Fluid dispensers are well known for dispensing hand cleaning fluids as may be provided, for example, in washrooms and hospitals. Examples of such dispensers include those disclosed in U.S. Patent Publication US 2008/0121663 to Ophardt et al, published May 29, 2008; U.S. Patent Publication US 2010/0288788 to Ophardt published Nov. 18, 2010; U.S. Patent Publication US 2011/0017769 to Ophardt published Jan. 27, 2011; U.S. Patent Publication US 2007/0158363 to Ophardt published Jul. 12, 2007 and U.S. Patent Publication US 2010/0147879 to Ophardt et al published Jun. 17, 2010, the disclosures of which are incorporated herein by reference. With such dispensers, as fluid in the reservoir is used up, the fluid needs to be replaced as by refilling a refillable reservoir or removing and replacing an empty reservoir with a reservoir which is filled with fluid.

U.S. Pat. No. 9,027,788 issued May 12, 2015 to Ophardt et al, the disclosure of which is incorporated herein by reference, teaches an optical fluid level gauge for determining the height of a fluid in a bottle. The applicant has appreciated that the optical fluid level gauge taught by U.S. Pat. No. 9,027,788 suffers from a number of disadvantages. While the optical fluid level gauge taught by U.S. Pat. No. 9,027,788 is advantageous for use with collapsible bottles, its ability to accurately predict fluid levels in non-collapsible bottles is not adequate to meet requirements for real time monitoring of fluid levels, particular where monitoring is desired for relatively accurate estimation of the actual level of fluid remaining in the reservoir at any time and/or the changes of fluid levels with time.

SUMMARY OF THE INVENTION

To at least partially overcome these disadvantages of previously known devices, the present invention provides a fluid level gauging mechanism with a plurality, preferably three or more, vertically spaced optical sensors located closely adjacent an external of a side wall of the reservoir to each receive electromagnetic radiation transmitted through the side wall from within the reservoir with the electromagnetic radiation sensed originating from an emitter directing the electromagnetic radiation preferably through the reservoir downwardly.

An object of the present invention is to provide a simplified fluid level gauge for estimating the fluid level within a reservoir bottle.

In one aspect, the present invention provides a dispenser comprising:

a housing, a reservoir containing a fluid to be dispensed, a pump mechanism to dispense fluid from the reservoir, the reservoir having a wall defining a cavity therein within which fluid is contained, the fluid within the cavity of the reservoir having an upper surface which is located within the reservoir at a height which varies as the fluid is dispensed from the reservoir, the wall having an exterior surface and an interior surface, the interior surface facing the cavity, the housing carrying a fluid level gauging mechanism to estimate the level of fluid in the bottle, the fluid level gauging mechanism comprising:

an emitter of electromagnetic radiation within a range of wavelengths, and a plurality of sensors of electromagnetic radiation within the range of wavelengths, the emitter carried on the housing, each of the sensors carried on the housing external of the reservoir with the sensors arranged spaced from each other at different vertical heights, the wall of the reservoir permitting electromagnetic radiation within the range of wavelengths to pass through the wall, the emitter positioned to direct the electromagnetic radiation into the cavity of the reservoir, each sensor located outside of the reservoir exterior of the wall but closely adjacent to the exterior surface of the wall to receive electromagnetic radiation emitted by the emitter into the cavity of the reservoir that passes outwardly through the wall proximate the sensor, a controller to activate the emitter to emit the radiation and monitoring the emitted radiation sensed by each sensor and making a determination whether each sensor is at a height above or below the upper surface of the fluid in the reservoir based on the amount of the radiation monitored as sensed by each sensor.

Preferably, the emitter is located at a vertical height above the vertical height of a vertically highest sensor of the sensors.

Preferably, the controller makes a determination whether a respective one of the sensors is at a height above the upper surface of the fluid in the reservoir by determining if the radiation sensed by the respective one of the sensors is equal to or greater than a first pre-determined amount of the radiation, or when the radiation sensed by the respective one of the sensors is significantly different than the radiation sensed by the one of the sensors adjacent to but at a different vertical height than the respective one of the sensors.

Preferably, the dispenser including an activation event sensor to determine when the dispenser is activated to dispense the fluid, the dispenser including a replenishment event sensor to determine when a possible replenishment event occurs that the fluid in the reservoir may be changed by refilling the reservoir or replacing the reservoir, the controller performing the operation of activating the emitter to emit the radiation, monitoring the emitted radiation sensed by each sensor and making a determination whether each sensor is at a height above or below the upper surface of the fluid when the activation event sensor determines when the dispenser has been activated or the replenishment event sensor determines a possible replenishment event has occurred.

In another aspect, the present invention provides a method of determining whether the upper surface of a fluid within a cavity of a reservoir containing the fluid is above or below one or more of a plurality of vertically spaced radiation sensors external of the reservoir, the method comprising:

activating directing the radiation, preferably downwardly, into the cavity of the reservoir, monitoring the emitted radiation sensed by each sensor, determining whether each sensor is at a height above or below the upper surface of the fluid in the reservoir based on the amount of the radiation monitored sensed by each sensor.

In a 1st feature, the present invention provides a hand cleaning fluid dispenser for dispensing a hand cleaning fluid downwardly out of a discharge outlet onto a person's hands below the discharge outlet, the dispenser comprising:

a backplate assembly adapted to be secured in a fixed orientation to a support structure, the backplate assembly having a wall plate with a forwardly directed front surface, the backplate assembly having a cartridge support shelf extending forwardly from the wall plate on the backplate assembly below the below the forwardly directed front surface of the wall plate, a reservoir bottle containing the fluid to be dispensed, the bottle having a wall defining a cavity therein within which fluid is contained, the bottle having a bottle outlet opening at a first end, the wall providing a bottle end wall closing the bottle at a second end of the bottle remote from the first end, the wall providing a bottle side wall between the bottle outlet and the bottle end wall, a pump mechanism to dispense fluid from the bottle, the pump mechanism carried on the first end of the bottle in communication with the fluid in the bottle via the bottle outlet opening, the bottle is not collapsible in that it does not collapse as the fluid is withdrawn from the bottle by the pump mechanism, the bottle and pump mechanism coupled together as a unit comprising a modular cartridge, the backplate assembly carrying below the support shelf a pump actuator mechanism for engagement with the pump mechanism, the pump actuator mechanism when activated operates the pump mechanism to dispense fluid from the discharge outlet, the cartridge removably coupled with the backplate assembly for removal and replacement by the same or a similar cartridge with the cartridge removably supported on the cartridge support shelf in engagement with the pump actuator mechanism, the cartridge when coupled to the backplate assembly is in engagement with the pump activation mechanism whereby with the cartridge coupled to the backplate assembly the pump actuator mechanism engages the pump mechanism to activate the pump mechanism when the pump actuator mechanism is activated to dispense the fluid from the discharge outlet, the fluid within the cavity of the bottle when inverted having an upper surface which is located within the bottle at a height between the bottle outlet opening and the bottle end wall which height decreases as the fluid is dispensed from the bottle, the wall having an exterior surface and an interior surface, the interior surface facing the cavity, the backplate assembly carrying a fluid level gauging mechanism to estimate the height of the upper surface of the fluid in the bottle when the cartridge is coupled to the backplate assembly, the fluid level gauging mechanism comprising:

an emitter of electromagnetic radiation within a range of wavelengths, and a plurality of sensors of electromagnetic radiation within the range of wavelengths, each of the sensors carried on the forwardly directed front surface of the wall plate of the backplate assembly with the sensors directed forwardly and arranged spaced from each other at different vertical heights, the cartridge when coupled to the backplate assembly is fixed to the backplate assembly and locates the bottle to be in an inverted condition with the bottle outlet opening at the first end at a height below a height of the bottle end wall at the second end of the bottle, with the exterior surface of the wall over the bottle end wall directed upwardly, and with a rear portion of the bottle sidewall having the exterior surface of the wall directed rearwardly in opposition to and in close proximity to the sensors carried on the forwardly directed front surface of the wall plate, the wall of the bottle permitting electromagnetic radiation within the range of wavelengths to pass through the wall, the emitter carried on the backplate assembly at a height above the bottle end wall, the emitter positioned to direct the electromagnetic radiation into the cavity of the bottle downwardly through the bottle end wall into the cavity when the cartridge is coupled to the housing, each sensor receiving electromagnetic radiation emitted by the emitter into the cavity of the bottle that passes outwardly through the rear portion of the bottle side wall of the wall in opposition to and in close proximity to the sensor, a controller to activate the emitter to emit the radiation and monitoring the emitted radiation sensed by each sensor and making a determination whether each sensor is at a height above or below the upper surface of the fluid in the bottle based on the amount of the radiation monitored as sensed by each sensor.

In a 2nd feature, as in the 1st feature, the present invention provides a dispenser wherein when the cartridge is coupled to the backplate assembly the exterior surface of the bottle end wall is located in opposition to and in close proximity to the emitter.

In a 3rd feature, as in the 1st or 2nd feature, the present invention provides a dispenser wherein the cartridge is removable from coupling with the backplate assembly by movement from a coupled position forwardly relative the backplate assembly to an uncoupled position forward of the housing, the cartridge movable from the uncoupled position rearwardly relative the backplate assembly of the backplate assembly into the coupled position to couple the cartridge to the backplate assembly.

In a 4th feature, as in the 1st, 2nd or 3rd features, the present invention provides a dispenser wherein:

the backplate assembly having a forwardly extending structure extending forwardly from the backplate on the backplate assembly above the backplate, the structure carrying the emitter located forwardly of the backplate and upwardly of the backplate above the bottle end wall, the backplate assembly defining forward of the backplate vertically between the forwardly extending structure and the cartridge support shelf a forwardly open space to receive a portion of the cartridge when coupled to the backplate assembly.

In a 5th feature, as in any one of the 1st to 4th features, the present invention provides a dispenser including a replenishment event sensor to determine when a possible replenishment event occurs that the cartridge is replaced by insertion of the cartridge, the controller performing the operation of activating the emitter to emit the radiation, monitoring the emitted radiation sensed by each sensor and making a determination whether each sensor is at a height above or below the upper surface of the fluid when the replenishment event sensor determines a possible replenishment event has occurred.

In a 6th feature, as in the 5th feature, the present invention provides a dispenser wherein the replenishment event sensor is carried on the backplate assembly.

In a 7th feature, as in the 6th feature, the present invention provides a dispenser wherein the replenishment event sensor is carried on the forwardly directed front surface on the backplate in opposition to the exterior surface of the wall rear portion of the bottle side wall and senses whether there is engagement of the wall rear portion of the bottle side wall with the replenishment event sensor.

In an 8th feature, as in any one of the 1st to 7th features, the present invention provides a dispenser wherein the sensors are arranged spaced from each other along a line extending vertically.

In a 9th feature, as in any one of the 1st to 8th features, the present invention provides a dispenser wherein the electromagnetic radiation is infrared radiation.

In a 10th feature, as in any one of the 1st to 9th features, the present invention provides a dispenser wherein the wall is a plastic material translucent to the electromagnetic radiation.

In an 11th feature, as in the 1st feature, the present invention provides a dispenser wherein the controller makes a determination.

In a 12th feature, the present invention provides a hand cleaning fluid dispenser for dispensing a hand cleaning fluid downwardly out of a discharge outlet onto a person's hands below the discharge outlet, the dispenser comprising:

a backplate assembly adapted to be secured in a fixed orientation to a support structure, the backplate assembly having a backplate with a forwardly directed front surface, a reservoir containing the fluid to be dispensed, the reservoir having a wall defining a cavity therein within which fluid is contained, the reservoir having a reservoir outlet opening at a first end, the wall providing a reservoir side wall between the reservoir outlet opening and a reservoir filling opening at a second end of the reservoir remote from the first end the reservoir, a pump mechanism carried by the backplate assembly below the backplate to dispense fluid from the reservoir, the pump mechanism coupled to the first end of the reservoir in communication with the fluid in the reservoir via the reservoir outlet opening, the reservoir is not collapsible in that it does not collapse as the fluid is withdrawn from the reservoir by the pump mechanism, the backplate assembly carrying a pump actuator mechanism for engagement with the pump mechanism, the pump actuator mechanism when activated operates the pump mechanism to dispense fluid from the discharge outlet, the fluid within the cavity of the reservoir having an upper surface which is located within the reservoir at a height between the reservoir outlet opening and the reservoir filling opening which height decreases as the fluid is dispensed from the reservoir, the wall having an exterior surface and an interior surface, the interior surface facing the cavity, the backplate assembly carrying a fluid level gauging mechanism to estimate the height of the upper surface of the fluid in the reservoir, the fluid level gauging mechanism comprising:

an emitter of electromagnetic radiation within a range of wavelengths, and a plurality of sensors of electromagnetic radiation within the range of wavelengths, each of the sensors carried on the forwardly directed front surface of the back wall of the backplate assembly with the sensors directed forwardly and arranged spaced from each other at different vertical heights, the backplate assembly carries the reservoir with the reservoir outlet opening at the first end at a height below a height of the reservoir filling opening at the second end of the bottle, with the exterior surface of the wall over the reservoir filling opening directed upwardly, and with a rear portion of the reservoir side wall having the exterior surface of the wall directed rearwardly in opposition to and in close proximity to the sensors carried on the forwardly directed front surface of the backplate, the wall of the reservoir permitting electromagnetic radiation within the range of wavelengths to pass through the wall, the emitter carried on the backplate assembly at a height above the reservoir end wall, the emitter positioned to direct the electromagnetic radiation into the reservoir downwardly through the reservoir filling opening, each sensor receiving electromagnetic radiation emitted by the emitter into the reservoir that passes outwardly through the rear portion of the reservoir side wall of the wall in opposition to and in close proximity to the sensor, a controller to activate the emitter to emit the radiation and monitoring the emitted radiation sensed by each sensor and making a determination whether each sensor is at a height above or below the upper surface of the fluid in the reservoir based on the amount of the radiation monitored as sensed by each sensor.

In a 13th feature, as in the 12th feature, the present invention provides a hand cleaning fluid dispenser wherein the backplate assembly having a reservoir support on the backplate for removably supporting the reservoir.

In a 14th feature, as in the 12th or 13th feature, the present invention provides a hand cleaning fluid dispenser including a removable reservoir cover closing the reservoir filling opening, the reservoir cover permitting electromagnetic radiation within the range of wavelengths to pass through the reservoir cover.

In a 15th feature, as in the 14th feature, the present invention provides a dispenser wherein the reservoir cover having an exterior surface and an interior surface with the interior surface facing the cavity, the exterior surface of the reservoir cover is located in opposition to and in close proximity to the emitter.

In a 16th feature, the present invention provides a hand cleaning dispenser for dispensing a hand cleaning fluid downwardly out of a discharge outlet onto a person's hands below the discharge outlet, the dispenser comprising:

a backplate assembly adapted to be secured in a fixed orientation to a support structure, the backplate assembly having a backplate with a forwardly directed front surface, the backplate assembly having a bottle support shelf extending forwardly from the backplate on the backplate assembly below the backplate, the backplate assembly having a pump support shelf extending forwardly from the backplate on the backplate assembly below the backplate, a reservoir bottle containing the fluid to be dispensed, the bottle having a wall defining a cavity therein within which fluid is contained, the bottle having a bottle outlet opening at a first end, the wall providing a bottle end wall closing the bottle at a second end of the bottle remote from the first end, the wall providing a bottle side wall between the bottle outlet and the bottle end wall, the side wall including proximate the first end a bottle upper end shoulder over which the exterior of the wall is directed upwardly, a pump mechanism to dispense fluid from the bottle, with the pump mechanism supported on the pump support shelf and the bottle supported on the bottle support shelf, the pump mechanism is in communication with the fluid in the bottle via the bottle outlet opening, the bottle is not collapsible in that it does not collapse as the fluid is withdrawn from the bottle by the pump mechanism, the backplate assembly carrying above the pump support shelf a pump actuator mechanism for engagement with the pump mechanism, the pump actuator mechanism when activated operates the pump mechanism to dispense fluid from the discharge outlet, the bottle removably coupled with the backplate assembly for removal and replacement by the same or a similar bottle with the bottle removably supported on the bottle support shelf in engagement with the pump actuator mechanism, the pump mechanism when coupled to the backplate assembly is in engagement with the pump activation mechanism whereby with the pump mechanism and the bottle coupled to the backplate assembly, the pump actuator mechanism engages the pump mechanism to activate the pump mechanism to dispense the fluid from the bottle out the discharge outlet, the fluid within the cavity of the bottle having an upper surface which is located within the bottle at a height between the bottle outlet opening and the bottle end wall which height decreases as the fluid is dispensed from the bottle, the wall having an exterior surface and an interior surface, the interior surface facing the cavity, the backplate assembly carrying a fluid level gauging mechanism to estimate the height of the upper surface of the fluid in the bottle when the cartridge is coupled to the backplate assembly, the fluid level gauging mechanism comprising:

an emitter of electromagnetic radiation within a range of wavelengths, and a plurality of sensors of electromagnetic radiation within the range of wavelengths, each of the sensors carried on the forwardly directed front surface of the back wall of the backplate assembly with the sensors directed forwardly and arranged spaced from each other at different vertical heights, the bottle when coupled to the backplate assembly is fixed to the backplate assembly and locates the bottle with the bottle outlet opening at the first end at a height below a height of the bottle end wall at the second end of the bottle, with the exterior surface of the wall over the bottle upper end shoulder directed upwardly, and with a rear portion of the bottle side wall having the exterior surface of the wall directed rearwardly in opposition to and in close proximity to the sensors carried on the forwardly directed front surface of the backplate, the wall of the bottle permitting electromagnetic radiation within the range of wavelengths to pass through the wall, the emitter carried on the backplate assembly at a height above the bottle upper end shoulder, the emitter positioned to direct the electromagnetic radiation into the cavity of the bottle downwardly through the bottle upper end shoulder into the cavity when the bottle is coupled to the housing, each sensor receiving electromagnetic radiation emitted by the emitter into the cavity of the bottle that passes outwardly through the rear portion of the bottle side wall of the wall in opposition to and in close proximity to the sensor, a controller to activate the emitter to emit the radiation and monitoring the emitted radiation sensed by each sensor and making a determination whether each sensor is at a height above or below the upper surface of the fluid in the bottle based on the amount of the radiation monitored as sensed by each sensor.

In a $17^{th}$ feature, as in the $16^{th}$ feature, the present invention provides a dispenser wherein when the bottle is coupled to the backplate assembly, the exterior surface of the bottle upper end shoulder is located in opposition to and in close proximity to the emitter.

In an $18^{th}$ feature, as in the $16^{th}$ or $17^{th}$ feature, the present invention provides a dispenser wherein:

the bottle removable from coupling with the backplate assembly by movement from a coupled position forwardly relative the backplate assembly to an uncoupled position forward of the backplate assembly, the bottle movable from the uncoupled position rearwardly relative the backplate assembly into the coupled position to couple the bottle to the backplate assembly.

In a $19^{th}$ feature, as in any one of the $16^{th}$ to $18^{th}$ features, the present invention provides a dispenser wherein the sensors are arranged spaced from each other along a line extending vertically.

In a $20^{th}$ feature, as in any one of the $16^{th}$ to $19^{th}$ features, the present invention provides a dispenser wherein the electromagnetic radiation is infrared radiation.

In a $21^{st}$ feature, as in any one of the $16^{th}$ to $20^{th}$ features, the present invention provides a dispenser wherein the wall is a plastic material translucent to the electromagnetic radiation.

In a $22^{nd}$ feature, as in any one of the $13^{th}$ to $21^{st}$ features, the present invention provides a dispenser wherein the dispenser including a replenishment event sensor to determine when a possible replenishment event occurs that the bottle is replaced by insertion of the bottle.

In a $23^{rd}$ feature, as in the $22^{nd}$ feature, the present invention provides a dispenser wherein the controller performing the operation such that when the replenishment event sensor determines a possible replenishment event has occurred, the controller activating the emitter to emit the radiation, monitoring the emitted radiation sensed by each sensor and making a determination whether each sensor is at a height above or below the upper surface of the fluid.

In a $24^{th}$ feature, as in the $19^{th}$ feature, the present invention provides a dispenser wherein the replenishment event sensor is carried on the backplate assembly.

In a $25^{th}$ feature, as in any one of the $22^{nd}$ to $24^{th}$ features, the present invention provides a dispenser wherein the replenishment event sensor is carried on the forwardly directed front surface on the backplate in opposition to the exterior surface of the wall rear portion of the bottle side wall and senses whether there is engagement of the wall rear portion of the bottle side wall with the replenishment event sensor.

In a $26^{th}$ feature, as in any one of the $13^{th}$ to $25^{th}$ features, the present invention provides a dispenser wherein the dispenser including an activation event sensor to determine when the dispenser has been activated by the pump mechanism being operated to dispense the fluid or the pump actuator mechanism is activated to operate the pump mechanism.

In a $27^{th}$ feature, as in the $26^{th}$ feature, the present invention provides a dispenser wherein the controller performing the operation such that when the activation event sensor determines a possible activation event has occurred the controller activating the emitter to emit the radiation, monitoring the emitted radiation sensed by each sensor and making a determination whether each sensor is at a height above or below the upper surface of the fluid.

In a 28th feature, as in any one of the 1st to 27th features, the present invention provides a method of operation of a dispenser wherein the controller makes a determination whether a respective one of the sensors is at a height above the upper surface of the fluid by determining if the radiation sensed by the respective one of the sensors is equal to or greater than a first pre-determined amount of the radiation.

In a 29th feature, as in the 28th feature, the present invention provides a method wherein the controller makes a determination whether a respective one of the sensors is at a height below the upper surface of the fluid by determining if the radiation sensed by the respective one of the sensors is equal to or less than a second pre-determined amount of the radiation.

In a 30th feature, as in the 28th or 29th feature, the present invention provides a method wherein the sensors include a vertically highest sensor and a vertically lowest sensor, the respective one of the sensors including the vertically highest sensor and the vertically lowest sensor.

In a 31st feature, as in any one of the 28th to 30th features, the present invention provides a method wherein the controller makes a determination whether a respective one of the sensors is at a height above the upper surface of the fluid in the reservoir by a comparison of the radiation sensed by the respective one of the sensors with radiation sensed by at least one of the sensors adjacent the respective one of the sensors.

In a 32nd feature, as in the 31st feature, the present invention provides a method wherein the controller makes a determination that a respective one of the sensors is at a height above the upper surface of the fluid in the reservoir when the radiation sensed by the respective one of the sensors is significantly greater than the radiation sensed by the one of the sensors adjacent to but at a vertical height below the respective one of the sensors.

In a 33rd feature, as in the 32nd feature, the present invention provides a method wherein the controller makes a determination that a respective one of the sensors is at a height below the upper surface of the fluid in the reservoir when the radiation sensed by the respective one of the sensors is significantly less than the radiation sensed by the one of the sensors adjacent to but at a vertical height above the respective one of the sensors.

In a 34th feature, the present invention provides a method of operation of a dispenser including:
providing a dispenser comprising:
a backplate assembly,
a reservoir containing a fluid to be dispensed,
a pump mechanism to dispense fluid from the reservoir,
the reservoir having a wall defining a cavity therein within which fluid is contained,
the fluid within the cavity of the reservoir having an upper surface which is located within the reservoir at a height which varies as the fluid is dispensed from the reservoir,
the wall having an exterior surface and an interior surface, the interior surface facing the cavity,
the backplate assembly carrying a fluid level gauging mechanism to estimate the level of fluid in the bottle,
the fluid level gauging mechanism comprising:
an emitter of electromagnetic radiation within a range of wavelengths, and a plurality of sensors of electromagnetic radiation within the range of wavelengths,
the emitter carried on the backplate assembly,
each of the sensors carried on the housing external of the reservoir with the sensors arranged spaced from each other at different vertical heights,
the wall of the reservoir permitting electromagnetic radiation within the range of wavelengths to pass through the wall,
the emitter positioned to direct the electromagnetic radiation into the cavity of the reservoir,
each sensor located outside of the reservoir exterior of the wall but closely adjacent to the exterior surface of the wall to receive electromagnetic radiation emitted by the emitter into the cavity of the reservoir that passes outwardly through the wall proximate the sensor,
the method comprising:
activating the emitter to emit the radiation into the cavity of the reservoir,
monitoring the emitted radiation sensed by each sensor,
determining whether each sensor is at a height above or below the upper surface of the fluid in the reservoir based on the amount of the radiation monitored as sensed by each sensor.

In a 35th feature, as in the 34th feature, the present invention provides a method including determining whether a respective one of the sensors is at a height above the upper surface of the fluid in the reservoir by determining if the radiation sensed by the respective one of the sensors is equal to or greater than a first pre-determined amount of the radiation.

In a 36th feature, as in the 35th to 36th feature, the present invention provides a method including determining whether a respective one of the sensors is at a height below the upper surface of the fluid in the reservoir by determining if the radiation sensed by the respective one of the sensors is equal to or less than a second pre-determined amount of the radiation.

In a 37th feature, as in the 35th or 36th feature, the present invention provides a method wherein the sensors include a vertically highest sensor and a vertically lowest sensor, selecting the respective one of the sensors including the vertically highest sensor and the vertically lowest sensor.

In a 38th feature, as in any one of the 35th to 37th features, the present invention provides a method including determining whether a respective one of the sensors is at a height above the upper surface of the fluid in the reservoir by a comparison of the radiation sensed by the respective one of the sensors with radiation sensed by at least one of the sensors adjacent the respective one of the sensors.

In a 39th feature, as in any one of the 35th to 37th features, the present invention provides a method including:
providing the dispenser including an activation event sensor to determine when the dispenser is activated to dispense the fluid,
performing the operation of activating the emitter to emit the radiation, monitoring the emitted radiation sensed by each sensor and making a determination whether each sensor is at a height above or below the upper surface of the fluid when the activation event sensor determines when the dispenser has been activated.

In a 40th feature, as in any one of the 35th to 39th features, the present invention provides a method including:
providing the dispenser including a replenishment event sensor to determine when a possible replenishment event occurs that the fluid in the reservoir may be changed by refilling the reservoir or replacing the reservoir,
performing the operation of activating the emitter to emit the radiation, monitoring the emitted radiation sensed by each sensor and making a determination whether each sensor is at a height above or below the upper surface of the fluid when the replenishment event sensor determines a possible replenishment event has occurred.

In a 41$^{st}$ feature, as in any one of the 35$^{th}$ to 40$^{th}$ features, the present invention provides a method including emitting with the emitter the radiation downwardly into the cavity.

BRIEF DESCRIPTION OF THE DRAWINGS

Further aspects and advantages of the present invention will become apparent from the following description taken together with the accompanying drawings in which.

DETAILED DESCRIPTION OF THE DRAWINGS

Figure 1:
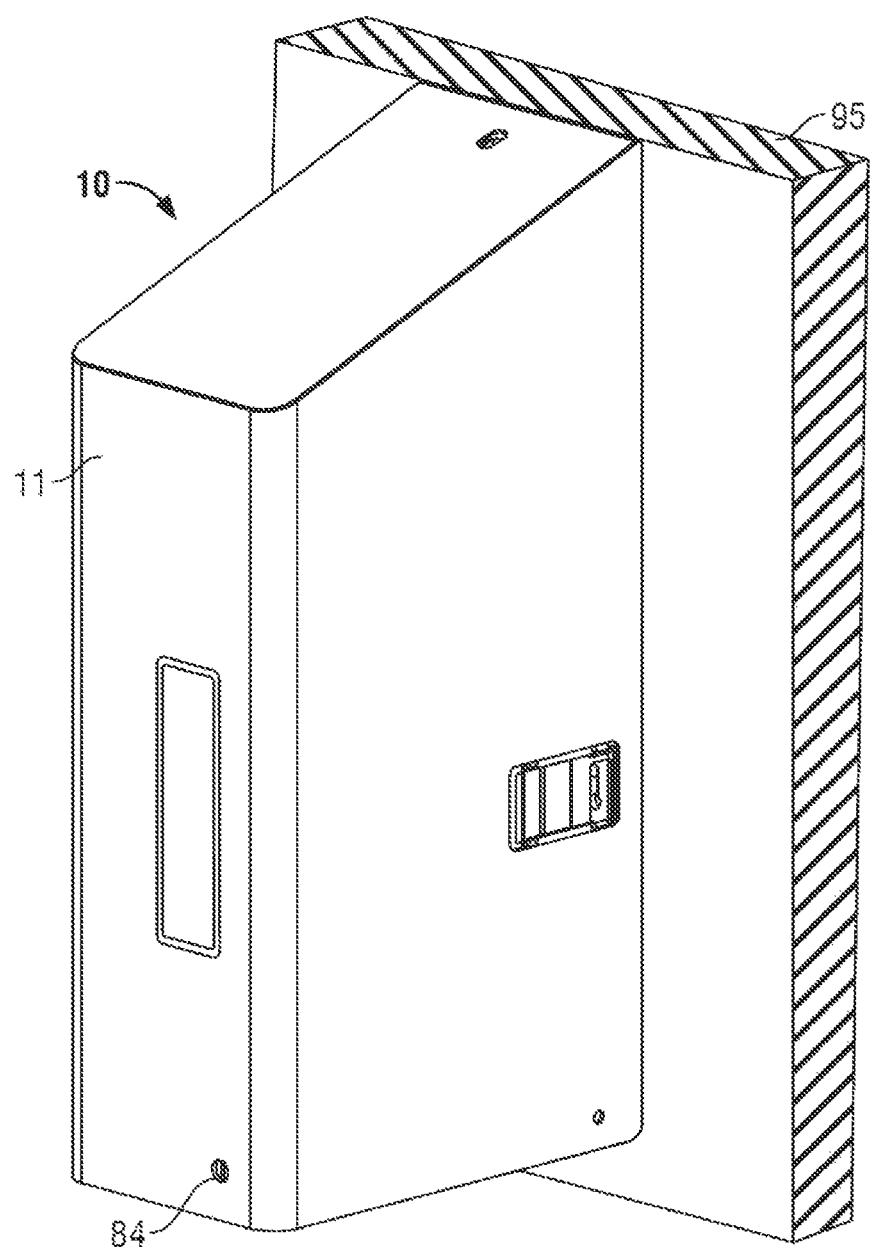
FIG. 1 shows a front pictorial view of a fluid dispenser in accordance with a first embodiment of the invention with a front cover housing in a closed position ready to dispense fluid onto a user's hand (not shown) to be disposed below the dispenser.
Figure 2:
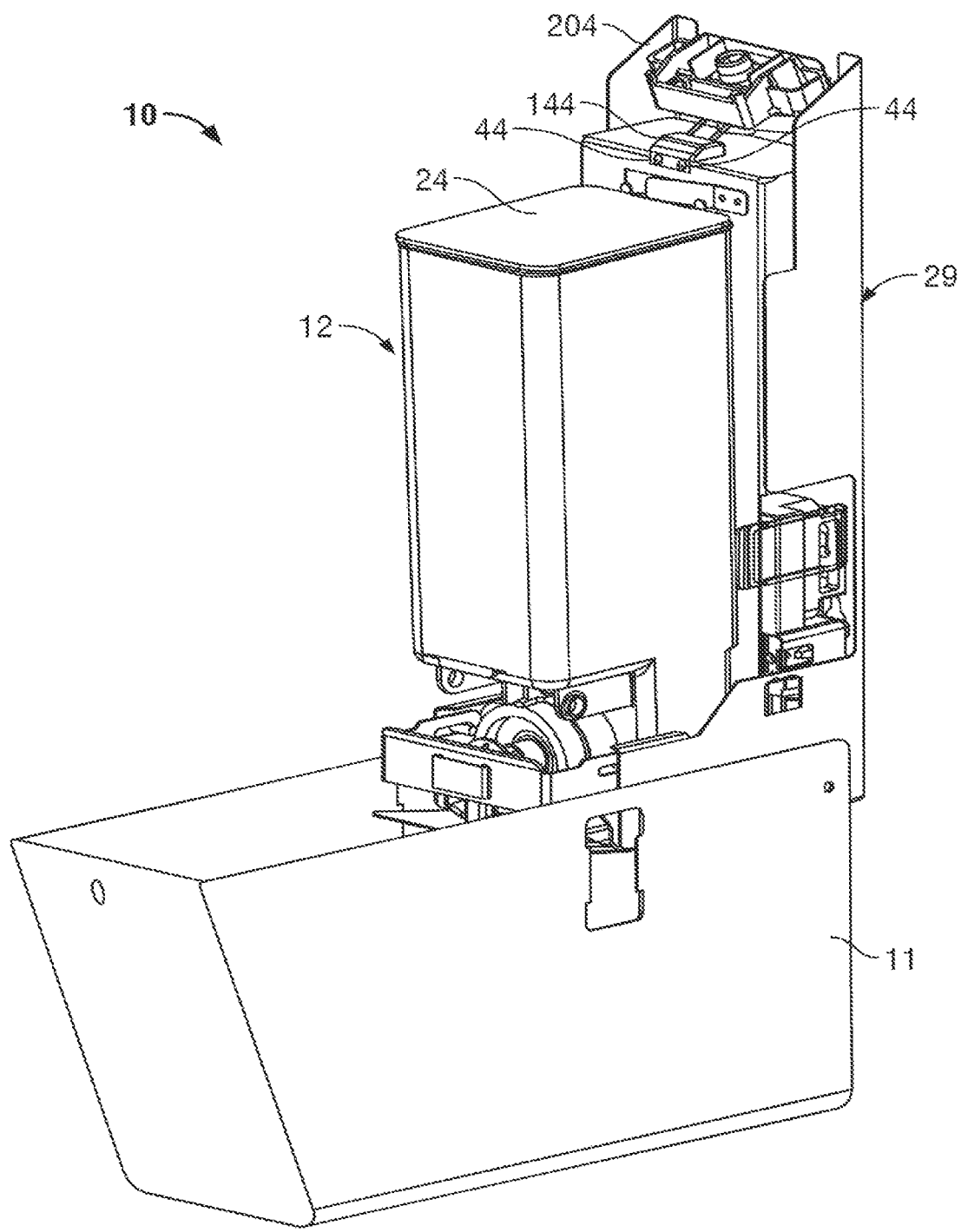
FIG. 2 is a front pictorial view of the fluid dispenser of FIG. 1 with a front housing pivoted forwardly to an open position relative a dispenser housing backplate assembly carrying a reservoir and a reservoir cover.
Figure 3:
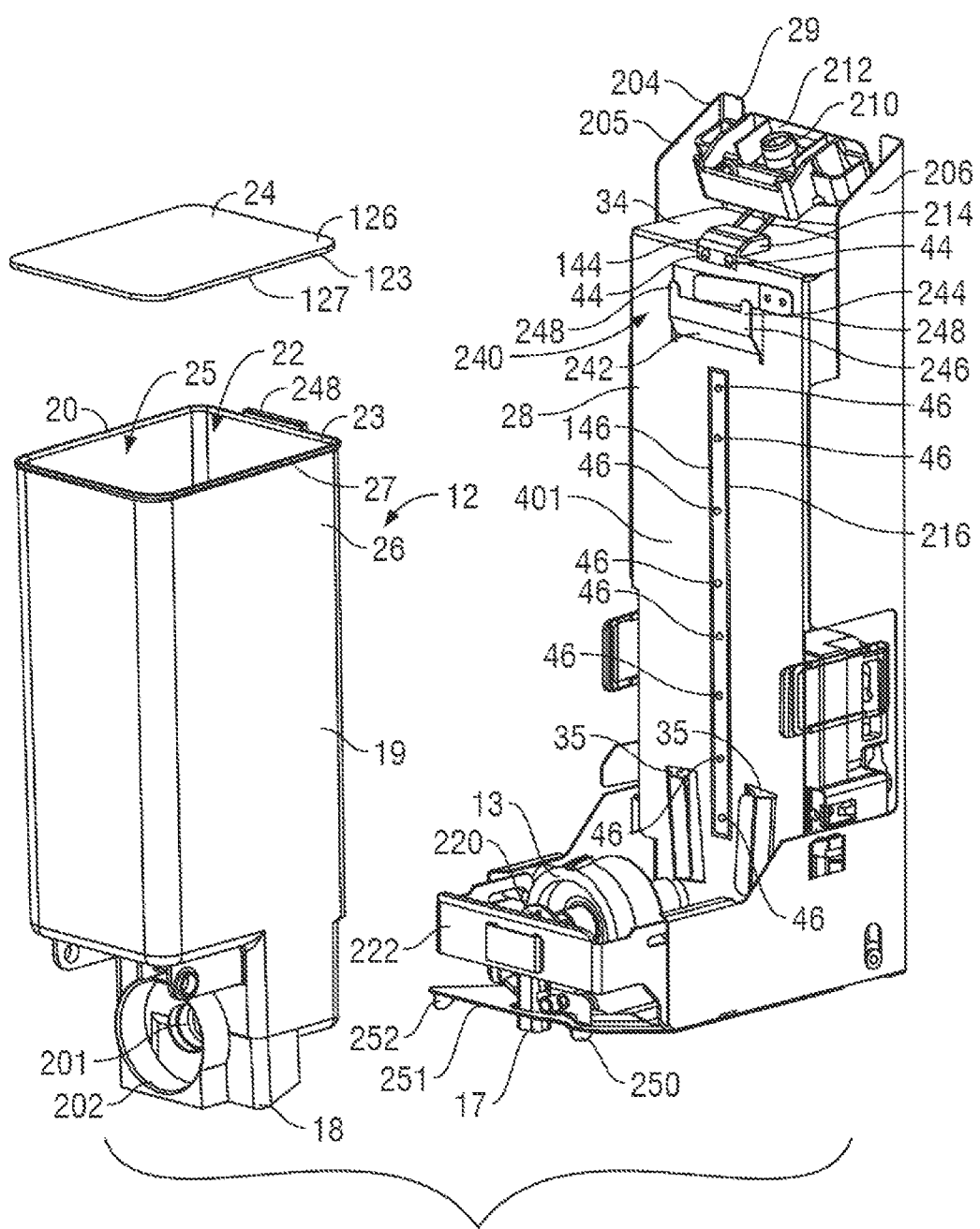
FIG. 3 is a partially exploded front pictorial view of the dispenser of FIG. 2 with the front housing not shown and the reservoir and the reservoir cover spaced forwardly from the dispenser backplate assembly.

FIGS. 1, 2 and 3 show a fluid dispenser 10 in accordance with the present invention having a housing 11, pivotally mounted to a backplate assembly 29 for pivoting between a closed position as seen in FIG. 1 and an open position in FIG. 2. The fluid dispenser 10 is mounted to a vertical support member including a support wall 95 schematically show on FIG. 1.

As seen in FIGS. 2 and 3, the backplate assembly 29 carries a reservoir 12 with a removable reservoir cover 24.

The reservoir 12 has a bottom or lower end 18. Sides 19 of the reservoir 12 extend upwardly from the lower end 18 to an open upper end 20 having an upwardly open opening 22. The sides 19 are characterized as a front side, rear side, right side and left side. The reservoir 12 has a thin wall 23 which forms the lower end 18 and sides 19. The wall 23 defines a cavity 25 within the reservoir 12 within which fluid 9 to be dispensed is contained. As seen in FIG. 3, the wall 23 has an outwardly directed exterior surface 26 and an interior surface 27 which faces inwardly into the cavity 25.

An optional, but preferred reservoir cover 24 engages the reservoir 12 to close the opening 22 and the cavity 25 as seen in FIGS. 1 and 2, for example. The reservoir cover 24 is formed by a cover wall 123 that has an outwardly directed exterior surface 126 and an interior surface 127 which faces inwardly into the cavity 25. The reservoir cover 24, if provided, is removable as seen in FIG. 3 such that with the reservoir 12 maintained coupled to the backplate assembly 29 with the housing 11 in the open position as seen in FIG. 2, the reservoir cover 24 can be manually removed and fluid poured through the upwardly directed reservoir filling opening 22 into the reservoir 12 to refill the reservoir without removing the reservoir from the backplate assembly 29.

As best see in FIG. 3, the backplate 28 carries a reservoir sensor 240 in the form of a reed switch with a front plate 242 and a rear plate 244. A resilient portion 246 of the front plate 242 is biased to an open position in which the resilient portion 246 extends forwardly and upwardly to be spaced forward of the rear plate 244 and be in the open position out of electrical contact with the rear plate 244. When a reservoir 12 is coupled to the dispenser 10, as seen in FIG. 2, with the cover 24 engaged on the reservoir 12, a rearward edge of the cover 24 engages spaced upwardly extending ears 248, the resilient portion 246 and deflects the resilient portion 246 rearward into a closed position in which the resilient portion 246 of the front plate 242 is in electrical contact with the rear plate 244, as seen in FIG. 2, closing the reed switch. The closing of the reed switch provides a signal indicating a coupling of the cover 24 to the reservoir 12 as would arise after, for example, a user may refill the reservoir 12 with the fluid 9.

The reservoir 12 has proximate its lower end 18 an outlet opening 201 with annular collar 202 for coupling with a pump mechanism 13 operative to draw fluid from the reservoir 12 and discharge the fluid vertically downwardly out of a discharge outlet 17 as onto a user's hand (not shown) to be disposed below the discharge outlet 17. The pump mechanism 13 shown includes a horizontally disposed piston pump with a piston member 220 that is moved by a horizontally slidable actuator member 222 driven by a motor arrangement 86 all carried on the backplate assembly 29.

Figure 7:
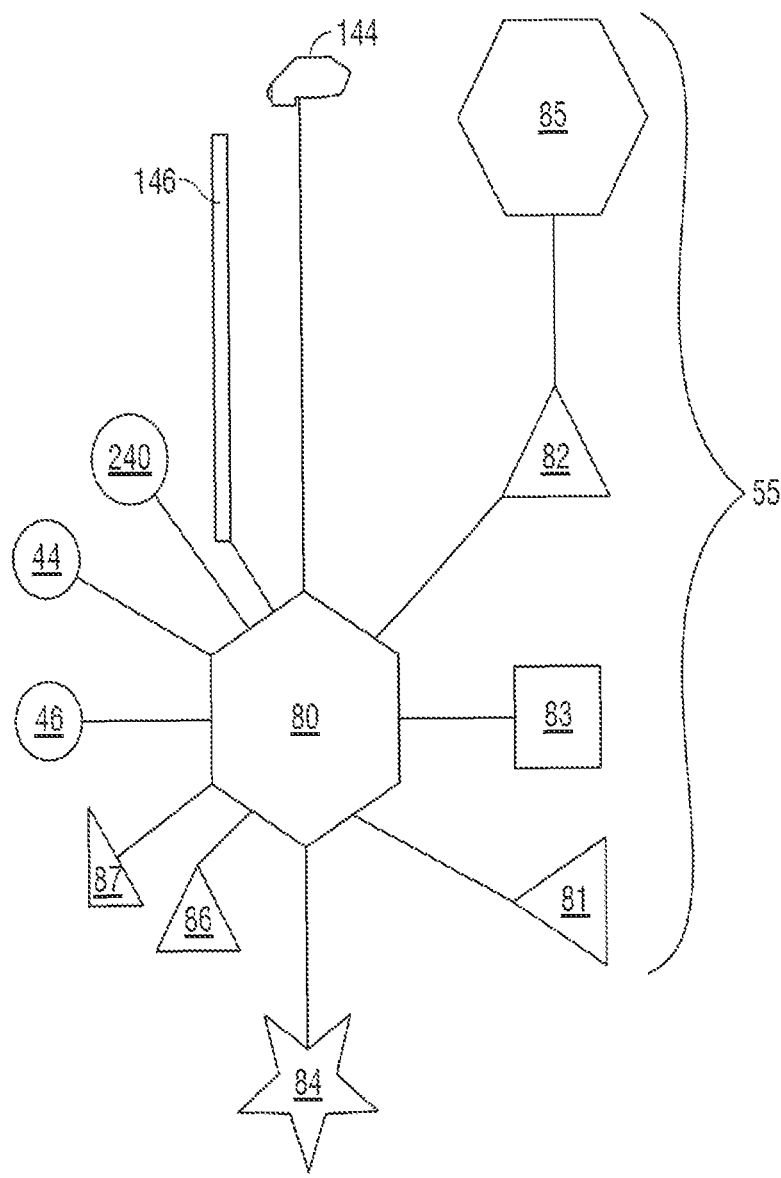
FIG. 7 is a schematic diagram of a control mechanism for the dispenser of FIG. 1.

FIG. 7 schematically illustrates a control mechanism 55 for the dispenser 10 as including a controller 80 that interfaces with each of an emitter mechanism 144, a sensor mechanism 146, a power source 81, a hand sensing mechanism 87, the reservoir sensor 240, the motor arrangement 86, a communication module 82, a data storage module 83, a status indicator 84 and a remote computer 85.

The fluid dispenser 10 operates in a known touchless manner with the hand sensing mechanism 87 provided on backplate assembly 29 to sense the presence of a user's hand under the discharge outlet 17. The hand sensing mechanism 87 is schematically shown on FIG. 3 as including an emitter 250 of infrared radiation carried on a lower portion 251 of the backplate assembly 29 near the discharge outlet 17 to direct infrared radiation downwardly to where a user's hand is to be located below the discharge outlet 17 and a sensor 252 of the infrared radiation emitted by the emitter 250 carried on the lower portion 251 of the backplate assembly 29 to receive the infrared radiation emitted by the emitter 250 that may be reflected from the user's hand and indicate a suitable positioning of the user's hand under the discharge outlet 17. The controller 80 is also carried on backplate assembly 29. The controller controls operation of the motor arrangement 86 to drive the pump mechanism 13 to discharge the fluid onto the user's suitably located hand. On the controller 80 determining a suitable indication from the hand sensing mechanism 86, the controller 80 operates the motor arrangement 13 to discharge a suitable amount of fluid onto the user's hand. The operation of the motor arrangement 13 is considered an event, namely, the activation of the dispenser to dispense the fluid 9.

The backplate assembly 29 has a rear housing 204 with a vertical backplate 29 and forward extending side plates 205 and 206. The backplate assembly 29 is adapted to be secured to the wall 95.

A vertical front wall plate or blackplate 28 is secured to the rear housing 204 so as to define an enclosed compartment 34 between the front wall plate 28 and rear housing 204 to accommodate selected components of dispenser 10 such as the controller 80, the hand sensing mechanism 87, the motor arrangement 86, the power source 81 such as batteries, the communications module 82 to provide communication to the remote computer 85, the data storage module 83, and the like.

Two reservoir support brackets 35 are provided on the front wall plate 28 to engage and support the reservoir 12 forward of the front wall plate 28.

The rear housing 204 carries a bridge member 212 that spans between the upper ends of the side plates 205 and 206. The bridge member 212 carries a latching mechanism 210 to releasably engage the upper rear of the housing 11 to releasably secure the housing 11 in the closed position.

Figure 4:
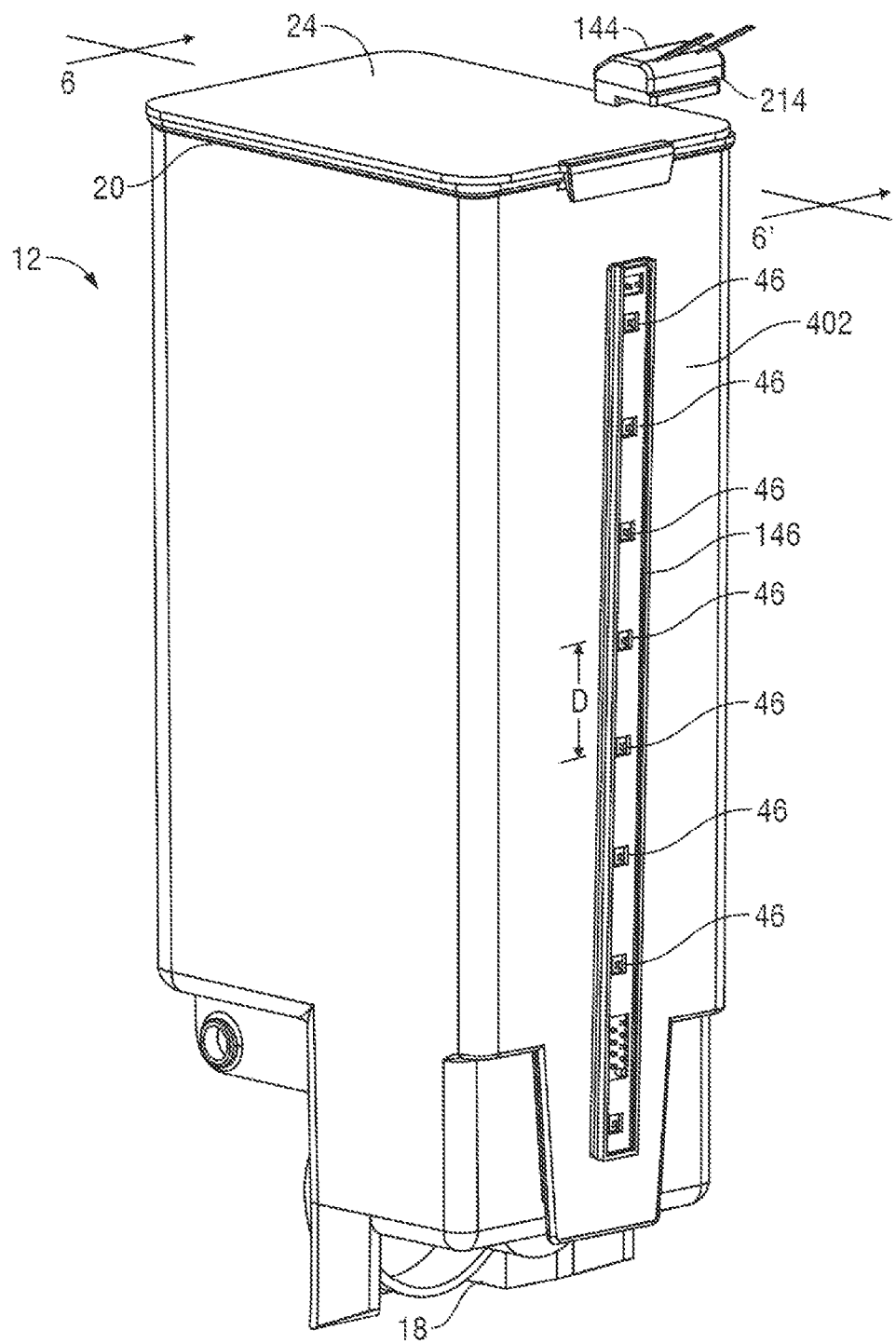
FIG. 4 is a schematic rear pictorial view of the assembled dispenser of FIG. 1, however, showing merely the reservoir and reservoir cover with selected elements of a fluid monitoring system, namely, a light emitting unit above the reservoir and the reservoir cover and a light sensor strip assembly disposed rearward of the reservoir.
Figure 5:
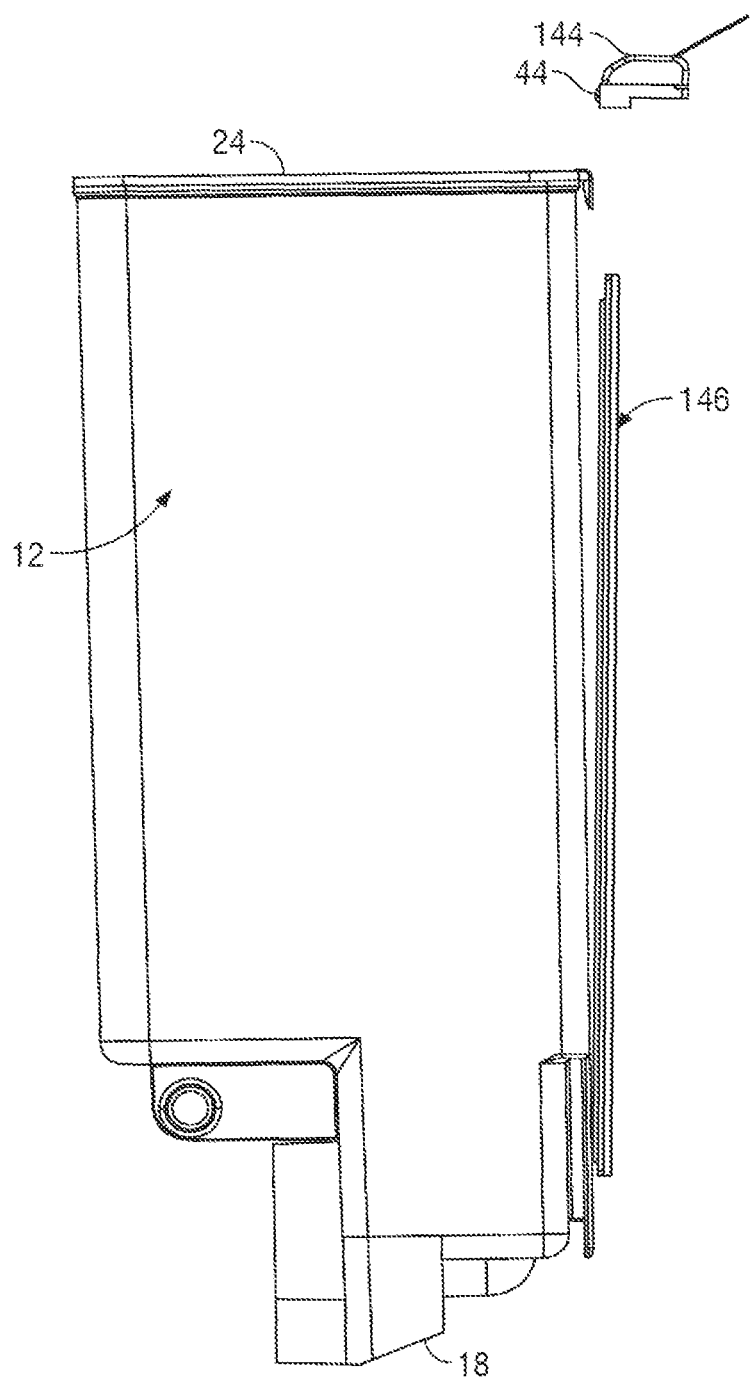
FIG. 5 is a schematic side view of FIG. 4.

The dispenser 10 includes a fluid level gauging mechanism. The fluid level gauging mechanism includes the emitter mechanism 144 and the sensor mechanism 146. As seen in FIGS. 2 and 3, the backplate assembly 29 carries, as supported on the bridge member 212, the emitter mechanism 144 and, as supported by the front wall plate 28, the sensor mechanism 146. FIG. 4 shows for ease of illustration merely the reservoir 12, the reservoir cover 24, the emitter mechanism 144 and the sensor mechanism 146.

The control mechanism 55 controls the operation of the emitter mechanism 144 and the sensor mechanism 146.

The emitter mechanism 144 includes an emitter holder 214 that carries a pair of emitters 44, preferably LED emitters to emit electromagnetic radiation. The electromagnetic radiation is preferably within a specific range of wavelengths. The electromagnetic radiation emitted is preferably infrared radiation.

The sensor mechanism 146 has an elongate sensor holder 216 that carries a number of sensors 46 that sense electromagnetic radiation representative of the radiation emitted by the emitters, preferably within the same specific range of wavelengths as the radiation emitted by the emitter 44.

Each sensor 46 is located outside the bottle 12, exterior of the exterior surface 27 of the wall 23 of the rear side of the bottle 12. The sensors 46 are each disposed rearward of the exterior surface 26 of the wall 23 of the rear side of the bottle 12, however, proximate to the exterior surface 26 of the wall 23. The wall 23 of the rear side of the bottle 12 in front of each sensor 46 permits IR radiation within the range of wavelengths emitted by the IR emitter 44 and capable of being sensed by the IR sensor 46 to pass through the wall 23 from within the reservoir 12 to each sensor 46.

Figure 6:
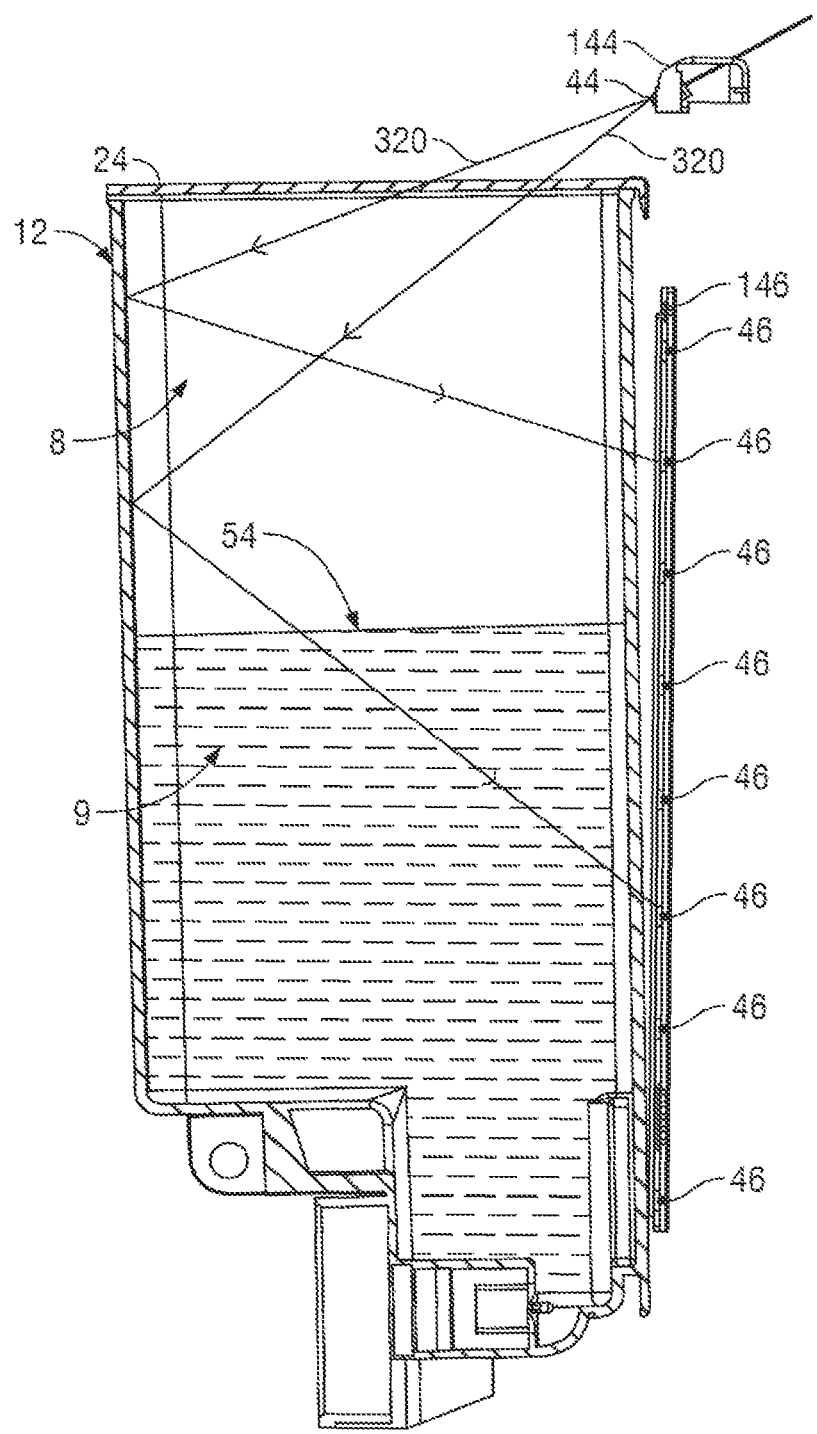
FIG. 6 is a schematic cross-sectional side view of the dispenser of FIG. 4 along section line 6-6' on FIG. 4.

The vertical front wall plate 28 also referred to as the backplate 28 has a forwardly directed front surface 401. The sensor mechanism 146 with its elongate sensor holder 216 and sensors 46 are carried on vertical front wall plate on the backplate 28. As seen in FIGS. 3 and 6, a rear portion 402 of the bottle side wall 24 presents the exterior surface 26 of the wall 23 directed rearwardly in opposition to and in close proximity to the sensors 46 carried on the forwardly directed front surface 401 of the backplate 28.

The sensors 46 are located at different vertical heights with each sensor 46 vertically spaced from adjacent sensors 46. The sensors are arranged preferably in a vertical plane of section line 6-6' on FIG. 4. The sensors 46 are shown as being spaced vertically apart from each other an equal distance D, however, the distance D need not be equal. Preferably, the distance D between adjacent sensors 46 will be smaller over portions of the reservoir where the accurate measurement of the height of fluid in the reservoir 12 is more crucial than other portions.

The emitters 44 are positioned above the reservoir 12 to direct IR radiation downward into the cavity 25 within the reservoir 12. As seen, the emitters 44 are positioned above the reservoir 12 to direct IR radiation downward onto the cover 24, such that the radiation emitted or at least a portion of the radiation emitted, passes downward through the cover 24 and downward into the cavity 25 within the reservoir 12. Once the emitted radiation is within the cavity 25, the radiation is at least in part reflected internally within the cavity 25 as schematically indicated by two radiation paths 320 showing reflection off the rear side 19. The reflection of the radiation within the cavity 25 includes on the radiation engaging any of the confining wall about the cavity 25 possibly some portion of such radiation being reflected back into the cavity 25. As well as on the radiation passing through the fluid in the cavity 25, the fluid may, depending on its characteristics, permit the radiation to pass therethrough and/or dispersing the radiation and/or reflect some portion of such radiation.

The emitters 44 are carried on the backplate assembly 29 at a height above the reservoir refilling opening 22. The reservoir cover 24 when provided permits IR radiation within the range of wavelengths emitted by the IR emitter 44 and capable of being sensed by the IR sensor 46 to pass through the reservoir into the reservoir 12. The reservoir cover 24 like the wall 23 has an interior surface open into the reservoir and an external surface. The external surface of the reservoir cover 24 is located in opposition to and in close proximity to the emitters 44.

The fluid in the reservoir 12 is shown as having an upper surface 54 representing the boundary between the fluid 9 and gas, principally air 8 above the fluid 9. Some portion of the radiation that passes downward into the cavity 25 will come to pass through the rear wall of the reservoir 12 in a direction to be engaged on and be sensed by the individual sensors 46. Radiation in the cavity 25 that passes through the air 8 above the upper surface 54 of the fluid 9 will pass through the air 8 freely. The amount of radiation that engages any sensor 46 that is above the upper surface 54 of the fluid 9 will be greater than the radiation that engages any sensor 46 that is below the upper surface 54 of the fluid 9. Therefore, the amount of energy sensed by each sensor and/or a comparison of the radiation sensed by each sensor compared to the other sensors, can provide indications as to whether the upper surface 54 of the fluid 9 is located above or below any one of the sensors 46.

Preferably, the radiation is emitted by the emitters 44 so as to minimize power consumption.

In a preferred method of operation of the dispenser 10, the fluid level gauging mechanism is operated to make a determination of the height of the upper surface 54 of the fluid 9 based on events that occur in the operation of the dispenser 10. Such events include an activation event of the activation of the dispenser towards dispensing the fluid, and a fluid replenishing event such as a refilling event of refilling the reservoir 12 with fluid. The activation events are known to the controller 80 as activation evens when the controller operates the motor arrangement 13. The reservoir sensor 24 provides the controller 80 with an indication of coupling of the cover to the reservoir as a possible fluid replenishing event. Preferably, the fluid level gauging mechanism is operated to determine the fluid level at every fluid replenishing event and any activation event. As one option, the fluid level gauging mechanism may determine the fluid level only on activation events which occur at a fixed time limit or a number of activation events after the last determination, for example.

Preferably, operation includes emitting one of the emitters 44 a single short burst of radiation and concurrently sensing with but a selected single one of the sensors 46 for such radiation emitter in the single burst. Preferably, if merely radiation in a single wavelength is to be emitted, then a separate burst is to be provided for each sensor 46. With knowledge of the radiation emitted in any burst, the relative intensity of the radiation sensed by any sensor 46 can be used to estimate whether or not the respective sensor 46 is above or below the upper surface 54 of the fluid 9. The radiation sensed by the sensors 46 as in any burst may be assessed by various techniques to estimate whether or not the respective sensor 46 is above or below the upper surface 54 of the fluid 9 including (a) comparing the relative radiation sensed by each sensor 46 to a pre-established threshold radiation for that sensor, (b) comparing the relative radiation sensed by each sensor 46 to the relative radiation sensed by other of the sensors, notably adjacent sensors 46, and (c) comparing the relative radiation sensed by each sensor 46 to historical values of the relative radiation sensed by the same or other of the sensors. However, using techniques (a) and (b) can be advantageous towards limiting energy consumption and the need for data storage capabilities. Suitable levels of radiation emitted by the emitters 44 in any burst and suitable pre-established threshold radiation for each sensor 46 for any burst can be established by simple trial and error experiment and/or by calculation, preferably based on data about the dispenser 10 and the fluid 9 to be dispensed.

Preferably in operation, the sensed radiation values for one or more of the highest height sensor 46, and the lowest height sensor will be assessed by technique (a) of comparing the relative radiation sensed by each sensor 46 to a pre-established threshold radiation for that sensor. Preferably, one or more of the next to highest sensor 46 and the next to lowest height sensor 46 will be assessed by technique (a) of comparing the relative radiation sensed by each sensor 46 to a pre-established threshold radiation for that sensor. Preferably, sensors 46 between the highest height sensor 46 and the lowest height sensor 46 will be assessed by technique (b) of comparing the relative radiation sensed by each sensor 46 to the relative radiation sensed by other of the sensors, notably each adjacent sensor 46.

FIGS. 1 to 7 may be characterized as illustrating the first embodiment of a hand cleaning fluid dispenser 10 for dispensing the hand cleaning fluid 9 downwardly out of a discharge outlet 17 onto a person's hands below the discharge outlet 17. The dispenser 10 includes a backplate assembly 29 adapted to be secured in a fixed orientation to a support structure such as the wall 95. The backplate assembly 29 has a backplate 28 with a forwardly directed front surface 401. The dispenser 10 includes a reservoir 12 containing the fluid 9 to be dispensed. The reservoir 12 has a reservoir outlet opening 201 at a first end 18. The wall 23 provides a reservoir side wall 19 between the reservoir outlet opening 201 and a reservoir filling opening 22 at a second end 20 of the reservoir 12 remote from the first end 18 the reservoir 12. The dispenser 10 includes a pump mechanism 13 carried by the backplate assembly 29 below the backplate 28 to dispense fluid from the bottle 12. The pump mechanism 13 is carried on the first end 18 of the reservoir 12 in communication with the fluid 9 in the reservoir 12 via the reservoir outlet opening 201. The reservoir 12 is not collapsible in that it does not collapse as the fluid is withdrawn from the reservoir 12 by the pump mechanism 13. The backplate assembly 29 carries a pump actuator mechanism 222 for engagement with the pump mechanism 13. The pump actuator mechanism 222 when activated operates the pump mechanism 13 to dispense fluid 9 from the discharge outlet 17. The fluid 9 within the cavity 25 of the reservoir 12 having an upper surface 54 which is located within the reservoir 12 at a height between the reservoir outlet opening 201 and the reservoir filling opening 22 which height decreases as the fluid is dispensed from the reservoir 12. The wall 23 has an exterior surface 26 and an interior surface 27 with the interior surface 27 facing the cavity 25. The backplate assembly 29 carries a fluid level gauging mechanism to estimate the height of the upper surface 54 of the fluid 9 in the reservoir 12. The fluid level gauging mechanism comprises an emitter 44 of electromagnetic radiation within a range of wavelengths, and a plurality of sensors 46 of electromagnetic radiation within the range of wavelengths. Each of the sensors 46 is carried on the forwardly directed front surface 401 of the backplate 28 of the backplate assembly 29 with the sensors 46 directed forwardly and arranged spaced from each other at different vertical heights. The backplate assembly 29 carries the reservoir 12 with the reservoir outlet opening 201 at the first end 18 at a height below a height of the reservoir filling opening 22 at the second end 20 of the reservoir 12, with the reservoir filling opening 22 directed upwardly, and with a rear portion 402 of the reservoir side wall 24 having the exterior surface 26 of the wall 23 directed rearwardly in opposition to and in close proximity to the sensors 46 carried on the forwardly directed front surface 410 of the backplate 28. The wall 23 of the reservoir 12 permitting electromagnetic radiation within the range of wavelengths to pass through the wall 23. The emitter 44 carried on the backplate assembly 29 at a height above the reservoir filling opening 22. The emitter 44 is positioned to direct the electromagnetic radiation into the reservoir 12 downwardly through the reservoir filling opening 22 when the reservoir 12 is coupled to the backplate assembly 29. Each sensor 46 receives electromagnetic radiation emitted by the emitter 44 into the reservoir 12 that passes outwardly through the rear portion of the reservoir side wall 24 of the wall 23 in opposition to and in close proximity to the sensor 46. A controller 80 to activate the emitter 44 to emit the radiation and monitoring the emitted radiation sensed by each sensor 46 and making a determination whether each sensor 46 is at a height above or below the upper surface 54 of the fluid 9 in the reservoir 12 based on the amount of the radiation monitored as sensed by each sensor 46. An optional removable reservoir cover 24 is provided closing the reservoir filling opening 22. The reservoir cover 24 permitting electromagnetic radiation within the range of wavelengths to pass through the reservoir cover 24. The reservoir cover 24 has an exterior surface and an interior surface with the interior surface facing into the reservoir 12. The exterior surface of the reservoir cover 24 is located in opposition to and in close proximity to the emitter 44.

Figure 8:
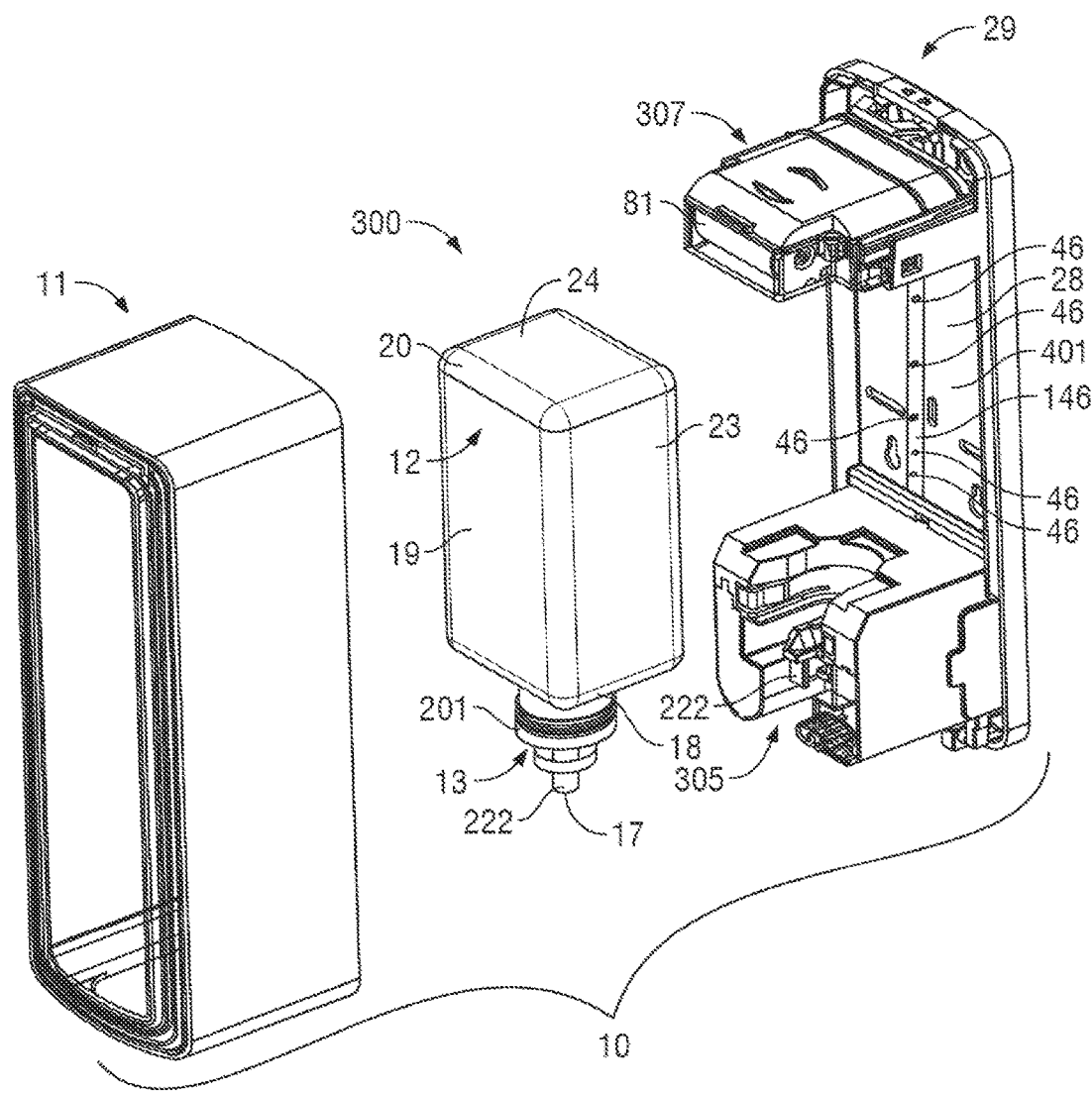
FIG. 8 is a partially exploded front pictorial view of a fluid dispenser in accordance with a second embodiment of the invention.
Figure 9:
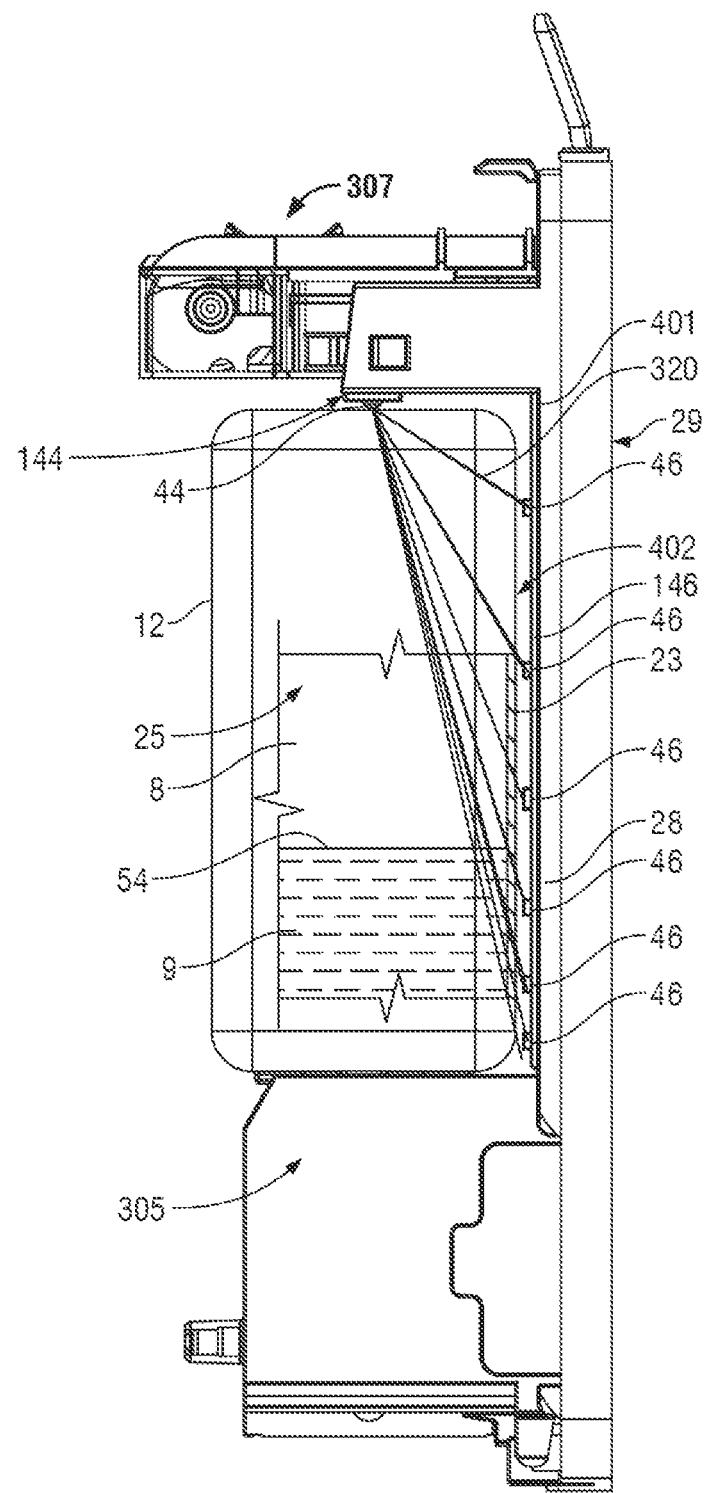
FIG. 9 is a side view of the reservoir and housing assembly of FIG. 9 with a portion of the side wall of the reservoir cut away to see the fluid inside.

Reference is made to FIGS. 8 and 9 showing a second embodiment of a fluid dispenser 10 in accordance with the present invention. In FIGS. 8 and 9, similar reference numerals are used to refer to similar elements.

As seen in FIG. 9, the touchless fluid dispenser 10 has a backplate assembly 29, a removable cartridge 300, and a shroud housing 11.

The backplate assembly 29 has a backplate also referred to as a wall plate 28 for securing to a wall, not shown. At a lower end of the wall plate 28, the backplate assembly 29 carries a forwardly extending support shelf structure 305 including an actuator mechanism 222 and a motor arrangement (not shown). At an upper end of the wall plate 28, the backplate assembly 29 carries a forwardly extending compartment forming structure 307 as to house a battery power source 81 and other electronic components of the dispenser 10. As in the embodiment of FIGS. 1 to 7, while not shown, the second embodiment of FIG. 8 includes a control mechanism 55 such as in FIG. 7 for the dispenser 10 as including a controller that interfaces with each of an emitter mechanism 144, a sensor mechanism 146, the power source 81, a hand sensing mechanism, a reservoir sensor, the motor arrangement, a communication module, an optional data storage module, an optional status indicator and an optional remote computer.

The cartridge 300 comprises a fluid containing inverted bottle reservoir 12 with a pump mechanism 13 secured in the outlet 201 of the bottle reservoir 12.

The cartridge 300 is horizontally slidable from the position in FIG. 8 rearwardly to engage the cartridge 300 on the support shelf structure 305 as seen in FIG. 9 coupling the reservoir 12 to the backplate assembly 29 against vertical movement and coupling of a piston 220 of the pump mechanism 13 to the actuator mechanism 222 that operates the pump mechanism 13 to dispense fluid downwardly onto a user's hand when the user's hand is sensed as suitably located below a discharge outlet 17. While not shown, the backplate assembly 29 carries a reservoir sensor which identifies as a possible replenishing event when a cartridge 300 including its reservoir 12 is coupled to the dispenser 10 as would arise after, for example, a user may replace a cartridge 300.

The shroud housing 11 is coupled to the backplate assembly 29 for movement between a closed position, not shown, to enclose the cartridge 300 and backplate assembly 29 for use in dispensing and an open position providing access to the cartridge 300 for removal and replacement.

As seen in the orientation of FIGS. 8 and 9, the reservoir 12 has a lower end 18 with the outlet 201. Sides 19 of the reservoir 12 extend upwardly from the lower end 18 to an upper end 20 closed by an upper end wall 24. The sides 19 are characterized as a front side, rear side, right side and left side. The reservoir 12 has a thin wall 23 which forms the upper end 24 and sides 19. The wall 23 defines a cavity 25 within the reservoir 12 within which fluid 9 to be dispensed is contained.

The dispenser 10 includes a fluid level gauging mechanism with an emitter mechanism 144 and a sensor mechanism 146, each of which is similar to the emitter mechanism 144 and the sensor mechanism 146 in the first embodiment. The emitter mechanism 144 is mounted to a lower surface of the compartment forming structure 307 so as to be directed vertically above the closed upper end wall 24 of the reservoir 12 with the exterior surface 26 of the bottle end wall 24 located in opposition to and in close proximity to the emitter 44. The sensor mechanism 146 is mounted on the wall plate 28 so as to present a number of sensors 46 directed forwardly vertically spaced from each other and closely rearward of the wall 23 of a rear side of the reservoir 12. In FIG. 9, the vertical spacing between the sensors 46 increases with vertical height.

The wall plate 28 also referred to as the backplate 28 has the forwardly directed front surface 401. The sensor mechanism 146 with its sensors 46 are carried on vertical front wall plate on the wall plate 28. As seen in FIG. 9, a rear portion 402 of the bottle side wall 24 over the rear side presents the exterior surface 26 of the wall 23 directed rearwardly in opposition to and in close proximity to the sensors 46 carried on the forwardly directed front surface 401 of the backplate 28.

The reservoir 12 in the second embodiment as in the first embodiment is non-collapsible and substantially maintains its shape as fluid is dispensed from it as by a venting arrangement that permit atmospheric air to enter the reservoir as liquid is discharged.

Operation of the fluid level gauging mechanism in the second embodiment is substantially identical to that in the first embodiment, however, with relative location of the emitter 44 permitting a path for radiation directly from the emitter 46 to each sensor 46 as schematically shown by the paths 320. Emitted radiation may most readily follow a direct path 320 to any respective one of the sensors 46 when the upper surface 54 of the fluid 9 is below the vertical height of each respective sensor 46.

The cartridge 300 is removable from coupling with the backplate assembly 29 by movement from the coupled position shown in FIG. 9 forwardly relative the backplate assembly 29 to the uncoupled position shown in FIG. 8 forward of the backplate assembly 29. The cartridge 300 movable from the uncoupled position rearwardly relative the backplate assembly 29 into the coupled position to couple the cartridge 300 to the backplate assembly 29. The backplate assembly 29 defines forward of the backplate 28 vertically between the forwardly extending structure 307 and the cartridge support shelf 305 a forwardly open space 404 to receive a portion of the cartridge 300 when coupled to the backplate assembly 29.

FIGS. 8 and 9 may be characterized as illustrating the second embodiment of a hand cleaning fluid dispenser 10 for dispensing the hand cleaning fluid 9 downwardly out of a discharge outlet 17 onto a person's hands below the discharge outlet 17. The dispenser 10 includes a backplate assembly 29 adapted to be secured in a fixed orientation to a support structure such as the wall 95 in the first embodiment. The backplate assembly 29 has a backplate 28 with a forwardly directed front surface 401. The backplate assembly 29 has a cartridge support shelf 305 extending forwardly from the backplate 28 on the backplate assembly 29 below the backplate 28. The dispenser 10 includes a reservoir bottle 12 containing the fluid 9 to be dispensed. The bottle 12 has a wall 23 defining a cavity 25 therein within which fluid 9 is contained. The bottle has a bottle outlet opening 201 at a first end 18. The wall 23 providing a bottle end wall 24 closing the bottle 12 at a second end 20 of the bottle 12 remote from the first end 18. The wall 23 provides a bottle side wall 19 between the bottle outlet 201 and the bottle end wall 24. The dispenser 10 includes a pump mechanism 13 to dispense fluid from the bottle 12. The pump mechanism 13 is carried on the first end 18 of the bottle 12 in communication with the fluid 9 in the bottle 12 via the bottle outlet opening 201. The bottle 12 is not collapsible in that it does not collapse as the fluid is withdrawn from the bottle 12 by the pump mechanism 13. The bottle 12 and pump mechanism 13 are coupled together as a unit comprising a modular cartridge 300. The backplate assembly 29 carries below the support shelf 305 a pump actuator mechanism 222 for engagement with the pump mechanism 13. The pump actuator mechanism 222 when activated operates the pump mechanism 13 to dispense fluid 9 from the discharge outlet 17. The cartridge 300 is removably coupled with the backplate assembly 29 for removal and replacement by the same or a similar cartridge 300. The cartridge 300 when coupled to the backplate assembly 29 is in engagement with the pump activation mechanism 222 whereby with the cartridge 300 coupled to the backplate assembly 29, the pump actuator mechanism 222 engages the pump mechanism 13 to activate the pump mechanism 12 to dispense the fluid 9 from the discharge outlet 17. The fluid 9 within the cavity 25 of the bottle 12 when inverted having an upper surface 54 which is located within the bottle 12 at a height between the bottle outlet opening 201 and the bottle end wall 24 which height decreases as the fluid is dispensed from the bottle 12. The wall 23 having an exterior surface 26 and an interior surface 27 with the interior surface 27 facing the cavity 25. The backplate assembly 29 carries a fluid level gauging mechanism to estimate the height of the upper surface 54 of the fluid 9 in the bottle 2 when the cartridge 300 is coupled to the backplate assembly 29. The fluid level gauging mechanism comprising an emitter 44 of electromagnetic radiation within a range of wavelengths, and a plurality of sensors 46 of electromagnetic radiation within the range of wavelengths. Each of the sensors 46 is carried on the forwardly directed front surface 401 of the backplate 28 of the backplate assembly 29 with the sensors 46 directed forwardly and arranged spaced from each other at different vertical heights. The cartridge 300 when coupled to the backplate assembly 29 is fixed to the backplate assembly 29 and locates the bottle 12 to be in an inverted condition with the bottle outlet opening 201 at the first end 18 at a height below a height of the bottle end wall 24 at the second end 20 of the bottle 12, with the exterior surface 26 of the wall 23 over the bottle end wall 24 directed upwardly, and with a rear portion 402 of the bottle side wall 24 having the exterior surface 26 of the wall 23 directed rearwardly in opposition to and in close proximity to the sensors 146 carried on the forwardly directed front surface 410 of the backplate 28. The wall 23 of the bottle 12 permitting electromagnetic radiation within the range of wavelengths to pass through the wall 23. The emitter 44 carried on the backplate assembly 29 at a height above the bottle end wall 24. The emitter 44 positioned to direct the electromagnetic radiation into the cavity 25 of the bottle 12 downwardly through the bottle end wall 24 into the cavity 25 when the cartridge 300 is coupled to the backplate assembly 29. Each sensor 46 receiving electromagnetic radiation emitted by the emitter 44 into the cavity 25 of the bottle 12 that passes outwardly through the rear portion of the bottle side wall 24 of the wall 23 in opposition to and in close proximity to the sensor 46. A controller 80 to activate the emitter 44 to emit the radiation and monitoring the emitted radiation sensed by each sensor 46 and making a determination whether each sensor 46 is at a height above or below the upper surface 54 of the fluid 9 in the bottle 12 based on the amount of the radiation monitored as sensed by each sensor 46. When the cartridge 300 is coupled to the backplate assembly 29 the exterior surface 26 of the bottle end wall 24 is located in opposition to and in close proximity to the emitter 44. The cartridge 300 is removable from coupling with the backplate assembly 29 by movement from a coupled position forwardly relative the backplate assembly 29 to an uncoupled position forward of the backplate assembly 29. The cartridge 300 movable from the uncoupled position rearwardly relative the backplate assembly 29 into the coupled position to couple the cartridge 300 to the backplate assembly 29. The backplate assembly 29 has a forwardly extending structure 307 extending forwardly from the wall plate 28 on the backplate assembly 29 above the backplate 28. The structure 307 carrying the emitter 44 located forwardly of the backplate 28 and upwardly of the backplate 28 above the bottle end wall 24. The backplate assembly 29 defines forward of the backplate 28 vertically between the forwardly extending structure 307 and the cartridge support shelf 305 a forwardly open space 404 to receive a portion of the cartridge 300 when coupled to the backplate assembly 29.

Figure 10:
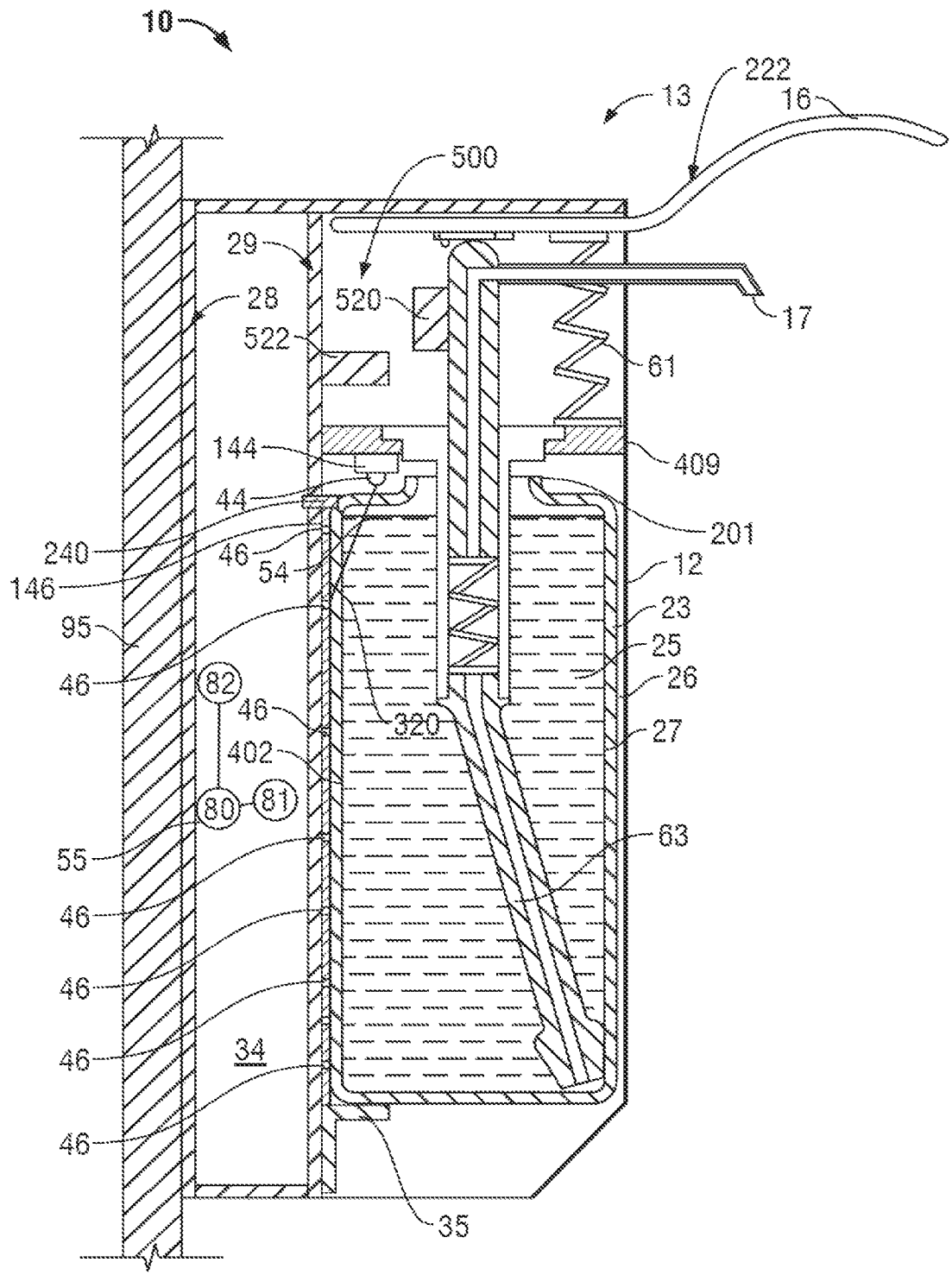
FIG. 10 shows a schematic cross-sectional side view of a fluid dispenser in accordance with a third embodiment of the invention.

Reference is made to FIG. 10 showing a third embodiment of a fluid dispenser 10 in accordance with the present invention using similar reference numerals to refer to similar elements as in the earlier Figures.

FIG. 10 illustrates the third embodiment of a hand cleaning fluid dispenser 10 for dispensing the hand cleaning fluid 9 downwardly out of a discharge outlet 17 onto a person's hands below the discharge outlet 17.

The dispenser 10 includes a backplate assembly 29 adapted to be secured in a fixed orientation to a support structure such as the wall 95 in the first embodiment. The housing 11 has a backplate 28 with a forwardly directed front surface 401. The backplate assembly 29 has a bottle support shelf 35 extending forwardly from the backplate 28 on the backplate assembly 29 below the backplate 28. The backplate assembly 29 has a pump support shelf 409 extending forwardly from the backplate 28 on the backplate assembly 29 above the backplate 28 and spaced above the bottle support shelf 35.

A manual pump mechanism 13 is carried at an upper end of the backplate assembly 29 with a dip tube 63 extending downwardly. A bottle reservoir 12 with an upwardly directed opening 201 is preferably supported for easy removal on the backplate assembly 29 with the dip tube 63 extending downwardly into the cavity 25 in the reservoir 12 and a lower end 18 of the reservoir 12 supported on the bottle support shelf 35 carried on the backplate assembly 29.

The dispenser 10 includes a reservoir bottle 12 containing the fluid 9 to be dispensed. The bottle 12 has a wall 23 defining the cavity 25 therein within which fluid 9 is contained. The wall 23 has an exterior surface 26 and an interior surface 27 with the interior surface 27 facing the cavity 25. The bottle has the bottle outlet opening 201 at a first end 18. The wall 23 providing a bottle end wall 24 closing the bottle 12 at a second end 20 of the bottle 12 remote from the first end 18. The wall 23 provides a bottle side wall 19 between the bottle outlet 201 and the bottle end wall 24. The bottle side wall 19 includes proximate the first end 18 a bottle upper end shoulder 411 over which the exterior surface 26 of the wall 23 is directed upwardly.

The dispenser 10 includes the pump mechanism 13 to dispense fluid from the bottle 12. The bottle 12 is removably coupled with the backplate assembly 29 for removal and replacement by the same or a similar bottle 12 with the bottle 12 removably supported on the bottle support shelf 35. With the pump mechanism 13 supported on the pump support shelf 409 and the bottle 12 supported on the bottle support shelf 35, the pump mechanism 13 is in communication with the fluid in the bottle 12 via the bottle outlet opening 201.

The bottle 12 is not collapsible in that it does not collapse as the fluid is withdrawn from the bottle 12 by the pump mechanism 13.

The backplate assembly 29 carries above the pump support shelf 305 a pump actuator mechanism 222 for engagement with the pump mechanism 13. The pump actuator mechanism 222 when activated operates the pump mechanism 13 to dispense fluid 9 from the discharge outlet 17. The pump mechanism 13 when coupled to the backplate assembly 29 is in engagement with the pump activation mechanism 222 whereby the pump actuator mechanism 222 engages the pump mechanism 13 to activate the pump mechanism 12 to dispense the fluid 9 from the discharge outlet 17. The fluid 9 within the cavity 25 of the bottle 12 having an upper surface 54 which is located within the bottle 12 at a height between the bottle outlet opening 201 and the bottle end wall 24 which height decreases as the fluid is dispensed from the bottle 12.

The backplate assembly 29 carries a fluid level gauging mechanism to estimate the height of the upper surface 54 of the fluid 9 in the bottle 2 when the bottle 12 is coupled to the backplate assembly 29. The fluid level gauging mechanism comprising an emitter 44 of electromagnetic radiation within a range of wavelengths, and a plurality of sensors 46 of electromagnetic radiation within the range of wavelengths. Each of the sensors 46 is carried on the forwardly directed front surface 401 of the wall plate 28 of the backplate assembly 29 with the sensors 46 directed forwardly and arranged spaced from each other at different vertical heights. The bottle 12 when coupled to the backplate assembly 29 locates the bottle 12 with the bottle outlet opening 201 at the first end 18 at a height above a height of the bottle end wall 24 at the second end 20 of the bottle 12, with the exterior surface 26 of the wall 23 over the bottle upper end shoulder 411 directed upwardly, and with a rear portion 402 of the bottle side wall 24 having the exterior surface 26 of the wall 23 directed rearwardly in opposition to and in close proximity to the sensors 46 carried on the forwardly directed front surface 401 of the backplate 28. The wall 23 of the bottle 12 permitting electromagnetic radiation within the range of wavelengths to pass through the wall 23.

The emitter 44 is carried on the backplate assembly 29 at a height above the bottle upper end shoulder 411. The emitter 44 positioned to direct the electromagnetic radiation into the cavity 25 of the bottle 12 downwardly through the bottle upper end shoulder 411 into the cavity 25 when the bottle is coupled to the backplate assembly 29. Each sensor 46 receiving electromagnetic radiation emitted by the emitter 44 into the cavity 25 of the bottle 12 that passes outwardly through the rear portion of the bottle side wall 24 of the wall 23 in opposition to and in close proximity to the sensor 46.

A controller 80 to activate the emitter 44 to emit the radiation and monitoring the emitted radiation sensed by each sensor 46 and making a determination whether each sensor 46 is at a height above or below the upper surface 54 of the fluid 9 in the bottle 12 based on the amount of the radiation monitored as sensed by each sensor 46.

When the bottle 12 is coupled to the backplate assembly 29 the exterior surface 26 of the bottle upper end shoulder 411 is located in opposition to and in close proximity to the emitter 44. The bottle 12 is removable from coupling with the backplate assembly 29 by movement from a coupled position forwardly relative the backplate assembly 29 to an uncoupled position forward of the backplate assembly 29. The bottle 12 is movable from the uncoupled position rearwardly relative the backplate assembly 29 into the coupled position to couple the bottle 12 to the backplate assembly 29. Preferably, the backplate assembly 29 carries the emitter 44 on the pump support shelf 409 located forwardly of the backplate 28 above the bottle upper end shoulder 411.

In FIG. 10, the dispenser 10 is manually operated with fluid 9 from the removable and replaceable reservoir 10 being discharged out a discharge outlet 17 by a user manually moving a lever handle 16 of the pump mechanism 13 downwardly against the bias of a return spring 61, to activate a pump mechanism 13 having a piston 222 of a piston pump to discharge fluid 9 in a retraction stroke and with, under the bias of the spring 61, in a withdrawal stroke, to draw the fluid 9 from the reservoir 12 into the piston pump from a reservoir 12 via the dip tube 63.

While the dispenser 10 is operated manually to dispense fluid, the dispenser 10 of FIG. 10 includes a control mechanism 55 including a controller 80 that interfaces with each of an emitter mechanism 144, a sensor mechanism 146, a power source 81, a communication module 82, an activation sensor 500, and a reservoir sensor 240. The controller 80, the power source 81, and the communication module 82 are schematically shown as being housed within a compartment 34 in the rear of the backplate assembly 29.

The activation sensor 500 is provided to sense as an activation event the manual movement of the lever handle 61. The activation sensor is schematically shown as a piezoelectric switch which provides a signal as a magnet 520 carried on the lever handle 16 moves past a sensor 522 on the backplate assembly 29.

The reservoir sensor 240 is provided to identify as a possible replenishing event, the event of coupling the reservoir 12 to the dispenser 10 as would arise after, for example, a user may replace an empty reservoir 12 with a full reservoir 12. As in the first embodiment in FIG. 10, the reservoir sensor 240 may comprise a reed switch but any other manner of switch may be used.

FIG. 10 shows the emitter mechanism 144 with an emitter 44 carried on the backplate assembly 29 so as to illuminate the interior of the reservoir 12 by directing radiation downwardly into the reservoir through an upper end of the reservoir 12. The sensor mechanism 146 is similar to that in the other embodiments comprising a plurality of vertically spaced sensors 46 carried on an elongate strip secured to the backplate assembly 29 immediately rearward of a rear wall of the reservoir 12 so as to sense radiation emitted by the emitters 44. Operation of the third embodiment of FIG. 10 is substantially the same as with the first embodiment.

FIG. 10 may be characterized as illustrating the third embodiment of a hand cleaning fluid dispenser 10 for dispensing the hand cleaning fluid 9 downwardly out of a discharge outlet 17 onto a person's hands below the discharge outlet 17. The dispenser 10 includes a backplate assembly 29 adapted to be secured in a fixed orientation to a support structure such as the wall 95 in the first embodiment. The housing 11 has a backplate 28 with a forwardly directed front surface 401. The backplate assembly 29 has a bottle support shelf 409 extending forwardly from the backplate 28 on the backplate assembly 29 below the backplate 28. The backplate assembly 29 has a pump support shelf 409 extending forwardly from the backplate 28 on the backplate assembly 29 above the backplate 28 and spaced above the bottle support shelf 409. The dispenser 11 includes a reservoir bottle 12 containing the fluid 9 to be dispensed. The bottle 12 has a wall 23 defining a cavity 25 therein within which fluid 9 is contained. The wall 23 has an exterior surface 26 and an interior surface 27 with the interior surface 27 facing the cavity 25. The bottle has a bottle outlet opening 201 at a first end 18. The wall 23 providing a bottle end wall 24 closing the bottle 12 at a second end 20 of the bottle 12 remote from the first end 18. The wall 23 provides a bottle sidewall 19 between the bottle outlet 201 and the bottle end wall 24. The bottle sidewall 19 includes proximate the first end 18 a bottle upper end shoulder 411 over which the exterior surface 26 of the wall 23 is directed upwardly. The dispenser 10 includes a pump mechanism 13 to dispense fluid from the bottle 12. The bottle 12 is removably coupled with the backplate assembly 29 for removal and replacement by the same or a similar bottle 12 with the bottle 12 removably supported on the bottle support shelf 305. With the pump mechanism 13 supported on the pump support shelf 409 and the bottle 12 supported on the bottle support shelf 305, the pump mechanism 13 is in communication with the fluid in the bottle 12 via the bottle outlet opening 201. The bottle 12 is not collapsible in that it does not collapse as the fluid is withdrawn from the bottle 12 by the pump mechanism 13. The backplate assembly 29 carries above the pump support shelf 305 a pump actuator mechanism 222 for engagement with the pump mechanism 13. The pump actuator mechanism 222 when activated operates the pump mechanism 13 to dispense fluid 9 from the discharge outlet 17. The pump mechanism 13 when coupled to the backplate assembly 29 is in engagement with the pump activation mechanism 222 whereby the pump actuator mechanism 222 engages the pump mechanism 13 to activate the pump mechanism 12 to dispense the fluid 9 from the discharge outlet 17. The fluid 9 within the cavity 25 of the bottle 12 having an upper surface 54 which is located within the bottle 12 at a height between the bottle outlet opening 201 and the bottle end wall 24 which height decreases as the fluid is dispensed from the bottle 12. The backplate assembly 29 carries a fluid level gauging mechanism to estimate the height of the upper surface 54 of the fluid 9 in the bottle 2 when the bottle 12 is coupled to the backplate assembly 29. The fluid level gauging mechanism comprising an emitter 44 of electromagnetic radiation within a range of wavelengths, and a plurality of sensors 46 of electromagnetic radiation within the range of wavelengths. Each of the sensors 46 is carried on the forwardly directed front surface 401 of the wall plate 28 of the backplate assembly 29 with the sensors 46 directed forwardly and arranged spaced from each other at different vertical heights. The bottle 12 when coupled to the backplate assembly 29 locates the bottle 12 with the bottle outlet opening 201 at the first end 18 at a height above a height of the bottle end wall 24 at the second end 20 of the bottle 12, with the exterior surface 26 of the wall 23 over the bottle upper end shoulder 411 directed upwardly, and with a rear portion 402 of the bottle side wall 24 having the exterior surface 26 of the wall 23 directed rearwardly in opposition to and in close proximity to the sensors 46 carried on the forwardly directed front surface 410 of the backplate 28. The wall 23 of the bottle 12 permitting electromagnetic radiation within the range of wavelengths to pass through the wall 23. The emitter 44 carried on the backplate assembly 29 at a height above the bottle upper end shoulder 411. The emitter 44 positioned to direct the electromagnetic radiation into the cavity 25 of the bottle 12 downwardly through the bottle upper end shoulder 411 into the cavity 25 when the bottle is coupled to the backplate assembly 29. Each sensor 46 receiving electromagnetic radiation emitted by the emitter 44 into the cavity 25 of the bottle 12 that passes outwardly through the rear portion of the bottle side wall 24 of the wall 23 in opposition to and in close proximity to the sensor 46. A controller 80 to activate the emitter 44 to emit the radiation and monitoring the emitted radiation sensed by each sensor 46 and making a determination whether each sensor 46 is at a height above or below the upper surface 54 of the fluid 9 in the bottle 12 based on the amount of the radiation monitored as sensed by each sensor 46. When the bottle 12 is coupled to the backplate assembly 29 the exterior surface 26 of the bottle upper end shoulder 411 is located in opposition to and in close proximity to the emitter 44. The bottle 12 is removable from coupling with the backplate assembly 29 by movement from a coupled position forwardly relative the backplate assembly 29 to an uncoupled position forward of the backplate assembly 29. The bottle 12 is movable from the uncoupled position rearwardly relative the backplate assembly 29 into the coupled position to couple the bottle 12 to the backplate assembly 29. Preferably, the backplate assembly 29 carries the emitter 44 on the pump support shelf 409 located forwardly of the backplate 28 above the bottle upper end shoulder 411.

In each of the three embodiments, the sensors 46 of the sensor mechanism 146 is external of the reservoir 12, however, located in close proximity to a wall of the reservoir 12 via which radiation from within the reservoir is to pass from within the cavity 35 of the reservoir 12 to the sensors 46. FIG. 10 shows the sensors 46 as in engagement with a rear wall of the reservoir 12 as is preferred. In the other embodiments, there is but a small spacing between the sensors 46 and the wall 23 of the side 19 of the reservoir 12.

In the first embodiment, the emitter 44 is located at the rear the reservoir 12 and the sensors 46 are also rearward of the reservoir 12. Thus, the emitters 44 and the sensors 46 are on the same side of the reservoir.

In the first embodiment with the emitters 44 and the sensors 44 on the same side of as the sensors 46 and the emitters 44 spaced to the rear of the reservoir 12, radiation from the emitters 44 cannot pass without reflection or diffusion from the emitter 44 to any one of the sensors 46. Rather, radiation to reach the sensors 46 from the emitters 44 must be reflected, refracted and/or diffused in a path from the emitters 44 through the cover 24 into the reservoir 12 and through the cavity of the reservoir 12 towards passing out through the wall of the reservoir 12 to the sensors 46. Such a path is indicated as 320 on FIG. 6 with reflection of the radiation off the wall 23 of the front side of the reservoir.

In the second embodiment, the emitter 44 is spaced towards the interior of the reservoir 12 from the wall of the reservoir which is adjacent to the sensors 46, that is, the emitter 46 is forward of the rear wall of the reservoir 12 and radiation from the emitters 44 can pass in a path without reflection from the emitter 44 to any one of the sensors 46. Of course, such a path may be altered by refraction and dispersion. Such paths are indicated as 320 on FIG. 9.

The relative location of the emitters 44 and sensors 46 is to be selected to preferably illuminate the interior cavity of the reservoir with radiation emitted so as to have a direct path from the emitter 44 to at least one sensor 46. Preferably, radiation is emitted by the emitter 44 at least partially downwardly relative to preferably at least one or more of the uppermost sensors 46.

The sensors 46 are in each embodiment shown as being at a rear side of the reservoir 12. The sensors 46 may be provided in a vertical array at other sides 19, or even the front side of the reservoir 12, however, for convenience of construction, the sensors 46 are preferably located at the rear side as shown or at left or right sides where they can preferably be fixed to the backplate assembly 29 rather than to, for example, a movable cover housing 11.

The reservoirs 12 and any cover 24 are made from materials which permit the radiation to pass through the walls of the reservoir 12. Preferably, the reservoir 12 and any cover are made from an at least partially translucent material to the radiation and, preferably, of a known polyolefin resin, preferably of polyethylene or preferably polyethylene terephthalate, common thermoplastic polymer resins of the polyester family which reflects the emitted radiation in a sufficient way.

Preferably, the emitter 44 has a wide emitting angle, for example, of at least 45 degrees and, more preferably, at least 60 degrees.

Preferably, the liquid is the liquid 9 is at least partially translucent to the radiation emitted, however, this is not necessary, with for at least one sensor 46, the radiation being directed downwardly within the reservoir 12 toward the sensor 46 from the emitter 44.

The refractive index of the fluid 9 of many known hand cleaning fluid such as water based soaps and water based alcohol hand cleanser is near the refractive index one of polyethylene and polyethylene terephthalate which assists in the radiation within the reservoir 12 passing from the reservoir 12 through its walls to the sensors 46 rather than being reflected.

There are different physical effects involved in the observed behavior of radiation emitted from the emitters 44 that is dependent on the medium which the radiation engages or through which the radiation passes, and the interface between adjacent media. The media involved are air, the fluid and the materials of the reservoir and any cover. The effects are notably reflection, refraction and dispersion. The path of the radiation may be considered a combination of dispersion, refraction and reflection and can be determined by simple experimentation and or by calculation.

The distance between the wall 23 of the reservoir 12 and the sensors 46 is to be selected to be small, preferably not greater than 1 cm, more preferably, not greater than 0.5 cm or 0.1 cm.

While the invention has been described with reference to preferred embodiments, many modifications and variations will now occur to persons skilled in the art. For a definition of the invention, reference is made to the following claims.

We claim:

1. A hand cleaning fluid dispenser for dispensing a hand cleaning fluid downwardly out of a discharge outlet onto a person's hands below the discharge outlet, the dispenser comprising:

a backplate assembly adapted to be secured in a fixed orientation to a support structure, the backplate assembly having a wall plate with a forwardly directed front surface, the backplate assembly having a cartridge support shelf extending forwardly from the wall plate on the backplate assembly below the below the forwardly directed front surface of the wall plate, a cartridge having a reservoir bottle containing the fluid to be dispensed, the bottle having a wall defining a cavity therein within which fluid is contained, the bottle having a bottle outlet opening at a first end, the wall providing a bottle end wall closing the bottle at a second end of the bottle remote from the first end, the wall providing a bottle side wall between the bottle outlet and the bottle end wall, a pump mechanism to dispense fluid from the bottle, the pump mechanism carried on the first end of the bottle in communication with the fluid in the bottle via the bottle outlet opening, the bottle is not collapsible in that it does not collapse as the fluid is withdrawn from the bottle by the pump mechanism, the bottle and pump mechanism coupled together as a unit comprising a modular cartridge, the backplate assembly carrying below the support shelf a pump actuator mechanism for engagement with the pump mechanism, the pump actuator mechanism when activated operates the pump mechanism to dispense fluid from the discharge outlet, the cartridge removably coupled with the backplate assembly for removal and replacement by the same or a similar cartridge with the cartridge removably supported on the cartridge support shelf in engagement with the pump actuator mechanism, the cartridge when coupled to the backplate assembly is in engagement with the pump activation mechanism whereby with the cartridge coupled to the backplate assembly the pump actuator mechanism engages the pump mechanism to activate the pump mechanism when the pump actuator mechanism is activated to dispense the fluid from the discharge outlet, the fluid within the cavity of the bottle when inverted having an upper surface which is located within the bottle at a height between the bottle outlet opening and the bottle end wall which height decreases as the fluid is dispensed from the bottle, the wall having an exterior surface and an interior surface, the interior surface facing the cavity, the backplate assembly carrying a fluid level gauging mechanism to estimate the height of the upper surface of the fluid in the bottle when the cartridge is coupled to the backplate assembly, the fluid level gauging mechanism comprising:

an emitter of electromagnetic radiation within a range of wavelengths, and a plurality of sensors of electromagnetic radiation within the range of wavelengths, each of the sensors carried on the forwardly directed front surface of the wall plate of the backplate assembly with the sensors directed forwardly and arranged spaced from each other at different vertical heights, the cartridge when coupled to the backplate assembly is fixed to the backplate assembly and locates the bottle to be in an inverted condition with the bottle outlet opening at the first end at a height below a height of the bottle end wall at the second end of the bottle, with the exterior surface of the wall over the bottle end wall directed upwardly, and with a rear portion of the bottle side wall having the exterior surface of the wall directed rearwardly in opposition to and in close proximity to the sensors carried on the forwardly directed front surface of the wall plate, the wall of the bottle permitting electromagnetic radiation within the range of wavelengths to pass through the wall, the emitter carried on the backplate assembly at a height above the bottle end wall, the emitter positioned to direct the electromagnetic radiation into the cavity of the bottle downwardly through the bottle end wall into the cavity when the cartridge is coupled to the housing, each sensor receiving electromagnetic radiation emitted by the emitter into the cavity of the bottle that passes outwardly through the rear portion of the bottle side wall of the wall in opposition to and in close proximity to the sensor, a controller to activate the emitter to emit the radiation and monitoring the emitted radiation sensed by each sensor and making a determination whether each sensor is at a height above or below the upper surface of the fluid in the bottle based on the amount of the radiation monitored as sensed by each sensor.

2. A dispenser as claimed in claim 1 wherein when the cartridge is coupled to the backplate assembly the exterior surface of the bottle end wall is located in opposition to and in close proximity to the emitter.

3. A dispenser as claimed in claim 2 wherein:
the cartridge removable from coupling with the backplate assembly by movement from a coupled position forwardly relative the backplate assembly to an uncoupled position forward of the backplate assembly,
the cartridge movable from the uncoupled position rearwardly relative the backplate assembly into the coupled position to couple the cartridge to the backplate assembly.

4. A dispenser as claimed in claim 3 wherein:
the backplate assembly having a forwardly extending structure extending forwardly from the wall plate on the backplate assembly above the wall plate,
the structure carrying the emitter located forwardly of the wall plate and upwardly of the wall plate above the bottle end wall,
the backplate assembly defining forward of the wall plate vertically between the forwardly extending structure and the cartridge support shelf a forwardly open space to receive a portion of the cartridge when coupled to the backplate assembly.

5. A dispenser as claimed in claim 4 wherein the dispenser including a replenishment event sensor to determine when a possible replenishment event occurs that the cartridge is replaced by insertion of the cartridge,
the controller performing the operation of activating the emitter to emit the radiation, monitoring the emitted radiation sensed by each sensor and making a determination whether each sensor is at a height above or below the upper surface of the fluid when the replenishment event sensor determines a possible replenishment event has occurred.

6. A dispenser as claimed in claim 5 wherein the replenishment event sensor is carried on the housing.

7. A dispenser as claimed in claim 6 wherein the replenishment event sensor is carried on the forwardly directed front surface on the backplate in opposition to the exterior surface of the wall rear portion of the bottle side wall and senses whether there is engagement of the wall rear portion of the bottle side wall with the replenishment event sensor.

8. A dispenser as claimed in claim 4 wherein the sensors are arranged spaced from each other along a line extending vertically.

9. A dispenser as claimed claim 8 wherein the electromagnetic radiation is infrared radiation.

10. A dispenser as claimed in claim 9 wherein the wall is a plastic material translucent to the electromagnetic radiation.

11. A dispenser as claimed claim 4 wherein the electromagnetic radiation is infrared radiation and the wall is a plastic material translucent to the electromagnetic radiation.

12. A hand cleaning fluid dispenser for dispensing a hand cleaning fluid downwardly out of a discharge outlet onto a person's hands below the discharge outlet, the dispenser comprising:
a backplate assembly adapted to be secured in a fixed orientation to a support structure,
the backplate assembly having a backplate with a forwardly directed front surface,
a reservoir containing the fluid to be dispensed,
the reservoir having a wall defining a cavity therein within which fluid is contained,
the reservoir having a reservoir outlet opening at a first end, the wall providing a reservoir side wall between the reservoir outlet opening and a reservoir filling opening at a second end of the reservoir remote from the first end the reservoir,
a pump mechanism carried by the backplate assembly below the backplate to dispense fluid from the reservoir,
the pump mechanism coupled to the first end of the reservoir in communication with the fluid in the reservoir via the reservoir outlet opening,
the reservoir is not collapsible in that it does not collapse as the fluid is withdrawn from the reservoir by the pump mechanism,
the backplate assembly carrying a pump actuator mechanism for engagement with the pump mechanism,
the pump actuator mechanism when activated operates the pump mechanism to dispense fluid from the discharge outlet,
the fluid within the cavity of the reservoir having an upper surface which is located within the reservoir at a height between the reservoir outlet opening and the reservoir filling opening which height decreases as the fluid is dispensed from the reservoir,
the wall having an exterior surface and an interior surface, the interior surface facing the cavity,
the backplate assembly carrying a fluid level gauging mechanism to estimate the height of the upper surface of the fluid in the reservoir,
the fluid level gauging mechanism comprising:
an emitter of electromagnetic radiation within a range of wavelengths, and a plurality of sensors of electromagnetic radiation within the range of wavelengths,
each of the sensors carried on the forwardly directed front surface of the backplate of the backplate assembly with the sensors directed forwardly and arranged spaced from each other at different vertical heights,
the backplate assembly carries the reservoir with the reservoir outlet opening at the first end at a height below a height of the reservoir filling opening at the second end of the bottle, with the exterior surface of the wall over the reservoir filling opening directed upwardly, and with a rear portion of the reservoir side wall having the exterior surface of the wall directed rearwardly in opposition to and in close proximity to the sensors carried on the forwardly directed front surface of the backplate,
the wall of the reservoir permitting electromagnetic radiation within the range of wavelengths to pass through the wall,
the emitter carried on the backplate assembly at a height above the reservoir end wall,
the emitter positioned to direct the electromagnetic radiation into the reservoir downwardly through the reservoir filling opening,
each sensor receiving electromagnetic radiation emitted by the emitter into the reservoir that passes outwardly through the rear portion of the reservoir side wall of the wall in opposition to and in close proximity to the sensor,
a controller to activate the emitter to emit the radiation and monitoring the emitted radiation sensed by each sensor and making a determination whether each sensor is at a height above or below the upper surface of the fluid in the reservoir based on the amount of the radiation monitored as sensed by each sensor.

13. A hand cleaning fluid dispenser as claimed in claim 12 wherein the backplate assembly having a reservoir support on the backplate for removably supporting the reservoir.

14. A hand cleaning fluid dispenser as claimed in claim 13 including a removable reservoir cover closing the reservoir filling opening, the reservoir cover permitting electromagnetic radiation within the range of wavelengths to pass through the reservoir cover.

15. A hand cleaning dispenser as claimed in claim 14 wherein the reservoir cover having an exterior surface and an interior surface, the interior surface facing into the reservoir, the exterior surface of the reservoir cover is located in opposition to and in close proximity to the emitter.

16. A hand cleaning fluid dispenser for dispensing a hand cleaning fluid downwardly out of a discharge outlet onto a person's hands below the discharge outlet, the dispenser comprising:
 a backplate assembly adapted to be secured in a fixed orientation to a support structure,
 the backplate assembly having a backplate with a forwardly directed front surface,
 the backplate assembly having a bottle support shelf extending forwardly from the backplate on the backplate assembly below the backplate,
 the backplate assembly having a pump support shelf extending forwardly from the backplate on the backplate assembly above the backplate,
 a reservoir bottle containing the fluid to be dispensed,
 the bottle having a wall defining a cavity therein within which fluid is contained,
 the bottle having a bottle outlet opening at a first end, the wall providing a bottle end wall closing the bottle at a second end of the bottle remote from the first end, the wall providing a bottle side wall between the bottle outlet and the bottle end wall, the side wall including proximate the first end a bottle upper end shoulder over which the exterior of the wall is directed upwardly,
 a pump mechanism to dispense fluid from the bottle,
 with the pump mechanism supported on the pump support shelf and the bottle supported on the bottle support shelf, the pump mechanism is in communication with the fluid in the bottle via the bottle outlet opening,
 the bottle is not collapsible in that it does not collapse as the fluid is withdrawn from the bottle by the pump mechanism,
 the backplate assembly carrying above the pump support shelf a pump actuator mechanism for engagement with the pump mechanism,
 the pump actuator mechanism when activated operates the pump mechanism to dispense fluid from the discharge outlet,
 the bottle removably coupled with the backplate assembly for removal and replacement by the same or a similar bottle with the bottle removably supported on the bottle support shelf in engagement with the pump actuator mechanism,
 the pump mechanism when coupled to the backplate assembly is in engagement with the pump activation mechanism whereby with the pump mechanism and the bottle coupled to the backplate assembly, the pump actuator mechanism engages the pump mechanism to activate the pump mechanism to dispense the fluid from the bottle out the discharge outlet,
 the fluid within the cavity of the bottle having an upper surface which is located within the bottle at a height between the bottle outlet opening and the bottle end wall which height decreases as the fluid is dispensed from the bottle,
 the wall having an exterior surface and an interior surface, the interior surface facing the cavity,
 the backplate assembly carrying a fluid level gauging mechanism to estimate the height of the upper surface of the fluid in the bottle when the cartridge is coupled to the backplate assembly,
 the fluid level gauging mechanism comprising an emitter of electromagnetic radiation within a range of wavelengths, and a plurality of sensors of electromagnetic radiation within the range of wavelengths,
 each of the sensors carried on the forwardly directed front surface of the backplate of the backplate assembly with the sensors directed forwardly and arranged spaced from each other at different vertical heights,
 the bottle when coupled to the backplate assembly is fixed to the backplate assembly and locates the bottle with the bottle outlet opening at the first end at a height below a height of the bottle end wall at the second end of the bottle, with the exterior surface of the wall over the bottle upper end shoulder directed upwardly, and with a rear portion of the bottle side wall having the exterior surface of the wall directed rearwardly in opposition to and in close proximity to the sensors carried on the forwardly directed front surface of the backplate,
 the wall of the bottle permitting electromagnetic radiation within the range of wavelengths to pass through the wall,
 the emitter carried on the backplate assembly at a height above the bottle upper end shoulder,
 the emitter positioned to direct the electromagnetic radiation into the cavity of the bottle downwardly through the bottle upper end shoulder into the cavity when the bottle is coupled to the housing,
 each sensor receiving electromagnetic radiation emitted by the emitter into the cavity of the bottle that passes outwardly through the rear portion of the bottle side wall of the wall in opposition to and in close proximity to the sensor,
 a controller to activate the emitter to emit the radiation and monitoring the emitted radiation sensed by each sensor and making a determination whether each sensor is at a height above or below the upper surface of the fluid in the bottle based on the amount of the radiation monitored as sensed by each sensor.

17. A dispenser as claimed in claim 16 wherein, when the bottle is coupled to the backplate assembly, the exterior surface of the bottle upper end shoulder is located in opposition to and in close proximity to the emitter,
 the bottle removable from coupling with the backplate assembly by movement from a coupled position forwardly relative the backplate assembly to an uncoupled position forward of the backplate assembly,
 the bottle movable from the uncoupled position rearwardly relative the backplate assembly into the coupled position to couple the bottle to the backplate assembly.

18. A dispenser as claimed in claim 17 wherein the dispenser including a replenishment event sensor carried on the backplate assembly to determine when a possible replenishment event occurs that the bottle is replaced by insertion of the bottle,
 the controller performing the operation such that when the replenishment event sensor determines a possible replenishment event has occurred, the controller activating the emitter to emit the radiation, monitoring the emitted radiation sensed by each sensor and making a determination whether each sensor is at a height above or below the upper surface of the fluid.

19. A dispenser as claimed in claim 18 wherein the dispenser including an activation event sensor to determine when the dispenser has been activated by the pump mechanism being operated to dispense the fluid or the pump actuator mechanism is activated to operate the pump mechanism, the controller performing the operation such that when the activation event sensor determines a possible activation event has occurred the controller activating the emitter to emit the radiation, monitoring the emitted radiation sensed by each sensor and making a determination whether each sensor is at a height above or below the upper surface of the fluid.

20. A method of operation of a dispenser as claimed in claim 1 wherein the controller makes a determination whether a respective one of the sensors is at a height above the upper surface of the fluid by determining if the radiation sensed by the respective one of the sensors: (a) is equal to or greater than a first pre-determined amount of the radiation, (b) is equal to or less than a second pre-determined amount of the radiation, or (c) by a comparison of the radiation sensed by the respective one of the sensors with radiation sensed by at least one of the sensors adjacent the respective one of the sensors.

\* \* \* \* \*